United States Patent
Yoshitani et al.

(10) Patent No.: US 7,863,218 B2
(45) Date of Patent: Jan. 4, 2011

(54) COATING COMPOSITION FOR PRODUCING HEAT-SENSITIVE TRANSFER IMAGE-RECEIVING SHEET AND HEAT-SENSITIVE TRANSFER IMAGE-RECEIVING SHEET

(75) Inventors: Toshihide Yoshitani, Kanagawa (JP); Masataka Yoshizawa, Kanagawa (JP); Takuya Arai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 878 days.

(21) Appl. No.: 11/711,672

(22) Filed: Feb. 28, 2007

(65) Prior Publication Data

US 2007/0202275 A1    Aug. 30, 2007

(30) Foreign Application Priority Data

Feb. 28, 2006   (JP) ............................. 2006-054021

(51) Int. Cl.
*B41M 5/035* (2006.01)
*B41M 5/42* (2006.01)
*B41M 5/50* (2006.01)

(52) U.S. Cl. .................................. 503/227; 428/32.39

(58) Field of Classification Search .................... None
See application file for complete search history.

(56) References Cited

U.S. PATENT DOCUMENTS 5,071,823 A * 12/1991 Matsushita et al. .......... 503/227
5,360,780 A * 11/1994 Okumura et al. ............ 503/227
7,138,359 B2 * 11/2006 Washizuka .................. 503/227
7,381,685 B2 *  6/2008 Oguma et al. ............... 503/227
7,485,402 B2 *  2/2009 Arai et al. ................... 430/201

FOREIGN PATENT DOCUMENTS

JP   2-265789 A    10/1990
JP   2005-62829 A   3/2005

* cited by examiner

*Primary Examiner*—Bruce H Hess
(74) *Attorney, Agent, or Firm*—Sughrue Mion, PLLC

(57) ABSTRACT

A coating composition for producing a heat-sensitive transfer image-receiving sheet comprising at least one receiving layer on a support, wherein the coating composition contains a polymer latex containing a repeating unit derived from a monomer represented by the following formula:

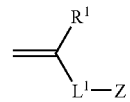

wherein $R^1$ represents a hydrogen atom, halogen atom or methyl group; $L^1$ represents a divalent connecting group; and Z represents a $C_8$-$C_{50}$ straight-chain, branched or cyclic hydrocarbon group.

13 Claims, No Drawings

COATING COMPOSITION FOR PRODUCING HEAT-SENSITIVE TRANSFER IMAGE-RECEIVING SHEET AND HEAT-SENSITIVE TRANSFER IMAGE-RECEIVING SHEET

BACKGROUND OF THE INVENTION

1. Field of the Invention

The present invention relates to a heat-sensitive transfer image-receiving sheet and more particularly to a heat-sensitive transfer image-receiving sheet having a high sensitivity and little image defects. The invention also relates to a coating composition for producing a heat-sensitive transfer image-receiving sheet.

2. Description of the Related Art

Various heat-sensitive transfer recording methods have been heretofore known. In particular, a dye dispersion transfer recording method has been noted as a process capable of preparing a color hard copy having the closest image quality to silver salt photograph (see "Joho Kiroku (haado kopi) to sono zairyouno shintenkai (New Development of Data Recording (hard copy) and Its Materials)", Toray Research Center, 1993, pp. 241-285, and "Purinta Zairyou no Kaihatsu (Development of Printer Materials)", CMC, 1995, page 180). Further, this dye dispersion transfer recording method is advantageous in that it can be operated in a dry process as compared with silver salt photography and allows direct visualization from digital data that facilitates reproduction.

In the dye dispersion transfer recording method, a heat-sensitive transfer sheet containing a dye (hereinafter referred to as "ink sheet") and a heat-sensitive transfer image-receiving sheet (hereinafter referred to as "image-receiving sheet") are laminated on each other. Subsequently, the ink sheet is heated by a thermal head which is controlled in heat generation by an electric signal so that the dye in the ink sheet is transferred to the image-receiving sheet to make recording of image data. Cyan, magenta and yellow colors are then recorded imposed on each other to make transfer recording of a color image having a continuous color density change.

As the support for the image-receiving sheet to be used in this process there may be used ordinary paper that allows production of image-receiving sheet at a reduced cost. In order to compensate the cushioning properties of the support, the image-receiving sheet comprising such paper as a support normally comprises a layer having high cushioning properties such as foaming layer made of resin and foaming agent provided interposed between the support and the receiving layer to provide the image-receiving sheet with cushioning properties and enhance the adhesion between the image-receiving sheet and the ink sheet. However, since the related art image-receiving sheet has heretofore been produced from an organic solvent-based resin coating solution, the coating solution fills the foam and void in the foaming layer, making it impossible to obtain desired cushioning properties. Thus, problems occurred that white marks or density unevenness occur during image formation or the heat insulating properties of the foaming layer are deteriorated to cause calorie required for dye transfer to be diffused toward the back surface of the image-receptive sheet, resulting in the drop of sensitivity during printing.

On the other hand, the employment of a method involving the spreading of a water-dispersible emulsion on the support allows delicate roughness developed by foaming layer in the receiving layer to reflect directly on the surface shape of the receiving layer. For example, JP-A-2-265789 and JP-A-2005-62829 disclose a receiving layer formed by a water-dispersible emulsion. This receiving layer imposes little burden on the global environment. Further, the material required therefor is relatively inexpensive. However, these inventions are disadvantageous in that the use of such a water-dispersible emulsion causes the deterioration of sharpness.

SUMMARY OF THE INVENTION

An object of the invention is to provide a heat-sensitive transfer image-receiving sheet having a high sensitivity, little image defects and a high sharpness. Another object of the invention is to provide a coating composition capable of easily producing a heat-sensitive transfer image-receiving sheet having these characteristics.

In order to solve the problems with the related art techniques, the prevent inventors made extensive studies. As a result, it has been found that the use of a coating composition containing a specific polymer latex makes it possible to form an image-receiving sheet having a high sensitivity and little image defects without forming any roughness on the surface of the receiving layer. The invention has been worked out on the basis of this knowledge.

In other words, the aforementioned problem can be solved by the following constitutions.

(1) A coating composition for producing a heat-sensitive transfer image-receiving sheet comprising at least one receiving layer on a support, wherein the coating composition contains a polymer latex containing a repeating unit derived from a monomer represented by the following formula [1];

Formula [1]

wherein $R^1$ represents a hydrogen atom, halogen atom or methyl group; $L^1$ represents a divalent connecting group; and Z represents a $C_8$-$C_{50}$ straight-chain, branched or cyclic hydrocarbon group.

(2) The coating composition for producing a heat-sensitive transfer image-receiving sheet as defined in Clause (1), wherein the monomer represented by the formula [1] is a monomer represented by the following formula [2]:

Formula [2]

wherein $R^2$ represents a hydrogen atom, halogen atom or methyl group; X represents an oxygen atom, sulfur atom or —N($R^c$)— in which $R^c$ represents a hydrogen atom or a $C_1$-$C_8$ alkyl group which may have substituents; and $Z^2$ represents a $C_{12}$-$C_{40}$ straight-chain or branched hydrocarbon group.

(3) The coating composition for producing a heat-sensitive transfer image-receiving sheet as defined in Clause (1), wherein the monomer represented by the formula [1] is a monomer represented by the following formula [3]:

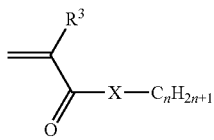

Formula [3]

wherein $R^3$ represents a hydrogen atom, halogen atom or methyl group; X represents an oxygen atom, sulfur atom or —N($R^c$)— in which $R^c$ represents a hydrogen atom or a $C_1$-$C_8$ alkyl group which may have substituents; and n represents an integer of from 20 to 30.

(4) The coating composition for producing a heat-sensitive transfer image-receiving sheet as defined in any one of Clauses (1) to (3), wherein the polymer latex further contains a copolymer containing a repeating unit represented by the following formula [4]:

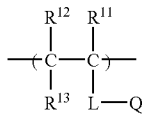

Formula [4]

wherein $R^{11}$, $R^{12}$ and $R^{13}$ each independently represent a hydrogen atom or substituent; L represents an arbitrary group selected from the following group of connecting groups or a divalent connecting group formed by two or more thereof in combination; and Q represents a carboxyl group (—COOH) or a salt thereof, sulfo group (—$SO_3H$) or a salt thereof or phosphoryl group (—$OPO_3H$) or a salt thereof.

(Group of Connecting Groups)
Single bond, —O—, —CO—, —$NR^{14}$—, —S—, —$SO_2$—, —P($=$O)($OR^{15}$)—, alkylene group, arylene group (in which $R^{14}$ represents a hydrogen atom, alkyl group, aryl group or aralkyl group and $R^{15}$ represents an alkyl group, aryl group or aralkyl group)

(5) The coating composition for producing a heat-sensitive transfer image-receiving sheet as defined in any one of Clauses (1) to (4), wherein the coating composition is a coating composition for receiving layer.

(6) A heat-sensitive transfer image-receiving sheet comprising at least one receiving layer on a support, wherein the receiving layer contains a polymer latex containing a repeating unit derived from a monomer represented by the following formula [1]:

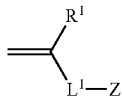

Formula [1]

wherein $R^1$ represents a hydrogen atom, halogen atom or methyl group; $L^1$ represents a divalent connecting group; and Z represents a $C_8$-$C_{50}$ straight-chain, branched or cyclic hydrocarbon group.

(7) The heat-sensitive transfer image-receiving sheet as defined in Clause (6), wherein a heat insulating layer contain-ing a hollow particulate material is provided between the support and the receiving layer.

The heat-sensitive transfer image-receiving sheet of the invention has a high sensitivity, little image defects and a high sharpness. The use of the coating composition of the invention makes it easy to prepare a heat-sensitive transfer image-receiving sheet having these characteristics.

BEST MODE FOR CARRYING OUT THE INVENTION

The coating composition for producing heat-sensitive transfer image-receiving sheet and the heat-sensitive transfer image-receiving sheet of the present invention will be further described hereinafter. The following descriptions of the constituent requirements are occasionally made on the basis of representative embodiments of the present invention, but the present invention is not limited thereto. The numerical range represented by the term " to " include the numerical values set forth before and after "to" as lower and upper limits, respectively.

(Layer Configuration of Heat-Sensitive Transfer Image-Receiving Sheet)

The heat-sensitive transfer image-receiving sheet of the invention comprises a dye-receiving layer formed on a support. An underlayer is preferably formed interposed between the receiving layer and the support. For example, a whiteness adjusting layer, charge adjusting layer, adhesive layer and primer layer may be formed. Further, a heat insulating layer is preferably provided interposed between the underlayer and the support. In the invention, the various layers disposed between the support and the receiving layer each are simply referred to as "interlayer". These interlayers include the aforementioned underlayer and heat insulating layer. The heat-sensitive transfer image-receiving sheet of the invention preferably contains at least one receiving layer and at least one interlayer. The support preferably has a curl adjusting layer, a writing layer and a charge adjusting layer formed on the back side thereof. More preferably, these layers are formed in combination.

(Coating Composition for Producing Heat-Sensitive Transfer Image-Receiving Sheet)

The coating composition for producing a heat-sensitive transfer image-receiving sheet of the invention is characterized in that it contains a polymer latex containing a repeating unit derived from a monomer represented by the formula [1]. The coating composition for producing a heat-sensitive transfer image-receiving sheet of the invention is preferably used for the formation of the receiving layer in particular.

<Polymer Latex>

The polymer latex containing a repeating unit derived from a monomer represented by the formula [1](hereinafter referred to as "polymer latex") will be described hereinafter.

In the formula [1], $R^1$ represents a hydrogen atom, halogen atom or methyl group, preferably hydrogen atom or methyl group. $L^1$ represents a divalent connecting group, preferably a connecting group containing any of oxygen atom, nitrogen atom and sulfur atom. Z represents a $C_8$-$C_{50}$ straight-chain, branched or cyclic hydrocarbon group, preferably a $C_8$-$C_{50}$ straight-chain or branched hydrocarbon group.

The monomer represented by the formula [1] of the invention is preferably a monomer represented by the formula [2].

In the formula [2], $R^2$ represents a hydrogen atom, halogen atom or methyl group, preferably hydrogen atom or methyl group. X represents an oxygen atom, sulfur atom or —$N(R^c)$—, most preferably oxygen atom. $Z^2$ represents a $C_{12}$-$C_{40}$ straight-chain or branched hydrocarbon group, preferably $C_{12}$-$C_{40}$ straight-chain or branched hydrocarbon group. $R^c$ represents a hydrogen atom or a $C_1$-$C_8$ alkyl group which may have substituents.

The monomer represented by the formula [1] of the invention is preferably a monomer represented by the formula [3]

In the formula [3], $R^3$ represents a hydrogen atom, halogen atom or methyl group, preferably hydrogen atom or methyl group. X represents an oxygen atom, sulfur atom or —$N(R^c)$—, preferably oxygen atom. The suffix n represents an integer of from 20 to 30. $R^c$ represents a hydrogen atom or a $C_1$-$C_8$ alkyl group which may have substituents.

The polymer latex of the invention is preferably a copolymer having a repeating unit represented by the formula [4] in addition to the aforementioned repeating unit.

In the formula [4], $R^{11}$, $R^{12}$ and $R^{13}$ each independently represent a hydrogen atom or substituent. L represents an arbitrary group selected from the following group consisting of connecting groups or a divalent connecting group formed by two or more thereof in combination.

(Group of Connecting Groups)

Single bond, —O—, —CO—, —$NR^{14}$—, —S—, —$SO_2$—, —$P(=O)(OR^{15})$—, alkylene group, arylene group (in which $R^{14}$ represents a hydrogen atom, alkyl group, aryl group or aralkyl group and $R^{15}$ represents an alkyl group, aryl group or aralkyl group)

Q represents a carboxyl group (—COOH) or salt thereof, sulfo group (—$SO_3H$) or salt thereof or phosphoryl group (—$OPO_3H$) or salt thereof.

The substituent to be used in the aforementioned formulae or the substituent in the term "which may have substituents" is preferably selected from the following group consisting of substituents.

(Group of Substituents)

Examples of a group of substituents include alkyl groups (preferably $C_1$-$C_{20}$, more preferably $C_1$-$C_{12}$, particularly preferably $C_1$-$C_8$ alkyl group, e.g., methyl group, ethyl group, isopropyl group, tert-butyl group, n-octyl group, n-decyl group, n-hexadecyl group), cycloalkyl groups (preferably $C_3$-$C_{20}$, more preferably $C_5$-$C_{20}$, particularly preferably $C_5$-$C_{12}$ cycloalkyl group, e.g., cyclopropyl group, cyclopentyl group, cyclohexyl group), alkenyl groups (preferably $C_2$-$C_{20}$, more preferably $C_2$-$C_{12}$, particularly preferably $C_2$-$C_8$ alkenyl group, e.g., vinyl group, aryl group, 2-butenyl group, 3-pentenyl group), alkinyl groups (preferably $C_2$-$C_{20}$, more preferably $C_2$-$C_{12}$, particularly preferably $C_2$-$C_8$ alkinyl group, e.g., propargyl group, 3-pentinyl group), aryl groups (preferably $C_6$-$C_{30}$, more preferably $C_6$-$C_{20}$, particularly preferably $C_6$-$C_{12}$ aryl group, e.g., phenyl group, p-methylphenyl group, naphthyl group), substituted or unsubstituted amino groups (preferably $C_0$-$C_{20}$, more preferably $C_0$-$C_{10}$, particularly preferably $C_0$-$C_6$ amino group, e.g., unsubstituted amino group, methylamino group, dimethylamino group, diethylamino group, anilino group), alkoxy groups (preferably $C_1$-$C_{20}$, more preferably $C_1$-$C_{16}$, particularly preferably $C_1$-$C_{10}$ alkoxy group, e.g., methoxy group, ethoxy group, butoxy group), alkoxycarbonyl groups (preferably $C_2$-$C_{20}$, more preferably $C_2$-$C_{16}$, particularly preferably $C_2$-$C_{10}$ alkoxycarbonyl group, e.g., methoxycarbonyl group, ethoxycarbonyl group), acyloxy groups (preferably $C_2$-$C_{20}$, more preferably $C_2$-$C_{16}$, particularly preferably $C_2$-$C_{10}$ acyloxy group, e.g., acetoxy group, benzoyloxy group), acylamino groups (preferably $C_2$-$C_{20}$, more preferably $C_2$-$C_{16}$, particularly preferably $C_2$-$C_{10}$ acylamino group, e.g., acetylamino group, benzoylamino group), alkoxycarbonylamino groups (preferably $C_2$-$C_{20}$, more preferably $C_2$-$C_{16}$, particularly preferably $C_2$-$C_{12}$ alkoxycarbonylamino group, e.g., methoxycarbonylamino group), aryloxycarbonylamino groups (preferably $C_7$-$C_{20}$, more preferably $C_7$-$C_{16}$, particularly preferably $C_7$-$C_{12}$ aryloxycarbonylamino group, e.g., phenyloxy carbonylamino group), sulfonylamino groups (preferably $C_1$-$C_{20}$, more preferably $C_1$-$C_{16}$, particularly preferably $C_1$-$C_{12}$ sulfonylamino group, e.g., methanesulfonylamino group, benzenesulfonylamino group), sulfamoyl groups (preferably $C_0$-$C_{20}$, more preferably $C_0$-$C_{16}$, particularly preferably $C_0$-$C_{12}$ sulfamoyl group, e.g., sulfamoyl group, methylsulfamoyl group, dimethylsulfamoyl group, phenyl sulfamoyl group), carbamoyl groups (preferably $C_1$-$C_{20}$, more preferably $C_1$-$C_{16}$, particularly preferably $C_1$-$C_{12}$ carbamoyl group, e.g., unsubstituted carbamoyl group, methylcarbamoyl group, diethylcarbamoyl group, phenyl carbamoyl group), alkylthio groups (preferably $C_1$-$C_{20}$, more preferably $C_1$-$C_{16}$, particularly preferably $C_1$-$C_{12}$ alkylthio group, e.g., methylthio group, ethylthio group), arylthio groups (preferably $C_6$-$C_{20}$, more preferably $C_6$-$C_{16}$, particularly preferably $C_6$-$C_{12}$ arylthio group, e.g., phenylthio group), sulfonyl groups (preferably $C_1$-$C_{20}$, more preferably $C_1$-$C_{16}$, particularly preferably $C_1$-$C_{12}$ sulfonyl group, e.g., mesyl group, tosyl group), sulfinyl groups (preferably $C_1$-$C_{20}$, more preferably $C_1$-$C_{16}$, particularly preferably $C_1$-$C_{12}$ sulfinyl group, e.g., methanesulfinyl group, benzene sulfinyl group), ureido groups (preferably $C_1$-$C_{20}$, more preferably $C_1$-$C_{16}$, particularly preferably $C_1$-$C_{12}$ ureido group, e.g., unsubstituted ureido group, methylureido group, phenylureido group), phosphoric acid amide groups (preferably $C_1$-$C_{20}$, more preferably $C_1$-$C_{16}$, particularly preferably $C_1$-$C_{12}$ phosphoric acid amide group, e.g., diethylphosphoric acid amide group, phenylphosphoric acid amide group), hydroxy groups, mercapto groups, halogen atoms (e.g., fluorine atom, chlorine atom, bromine atom, iodine atom), cyano groups, sulfo groups, carboxyl groups, nitro groups, hydroxamic acid groups, sulfino groups, hydrazino groups, imino groups, heterocyclic groups (preferably $C_1$-$C_{30}$, more preferably $C_1$-$C_{12}$ heterocyclic group such as heterocyclic group having heteroatoms such as nitrogen atom, oxygen atom and sulfur atom, e.g., imidazolyl group, pyridyl group, quinolyl group, furyl group, piperidyl group, morpholino group, benzooxazoyl group, benzimidazolyl group, benzthiazolyl group), and silyl groups (preferably $C_3$-$C_{40}$, more preferably $C_3$-$C_{30}$, particularly preferably $C_3$-$C_{24}$ silyl group, e.g., trimethylsilyl group, triphenylsilyl group).

These substituents may be further substituted by these substituents. Two or more of these substituents, if used, may be the same or different. If possible, these substituents may be connected to each other to form rings.

In the formula [4], $R^{11}$, $R^{12}$ and $R^{13}$ each independently preferably represent a hydrogen atom, alkyl group, halogen atom (e.g., fluorine atom, chlorine atom, bromine atom, iodine atom) or a group represented by -L-Q described later, more preferably hydrogen atom, $C_1$-$C_6$ alkyl group, chlorine atom or group represented by -L-Q, particularly preferably hydrogen atom or $C_1$-$C_4$ alkyl group, most preferably hydrogen atom or $C_1$-$C_2$ alkyl group. Specific examples of the alkyl group include methyl group, ethyl group, n-propyl group, n-butyl group, and sec-butyl group. The alkyl group may have substituents. Examples of the substituents include halogen atoms, aryl groups, heterocyclic groups, alkoxyl groups, aryloxy groups, alkylthio groups, arylthio groups, acyl groups, hydroxyl groups, acyloxy groups, amino groups, alkoxycarbonyl groups, acylamino groups, oxycarbonyl groups, carbamoyl groups, sulfonyl groups, sulfamoyl groups, sulfonamide groups, sulfolyl groups, and carboxyl groups.

The number of carbon atoms in the aforementioned alkyl group does not include that of the carbon atoms in the substituents. This applies also to other groups.

L represents a single bond, —O—, —CO—, —NR$^{14}$—, —S—, —SO$_2$—, —PO(OR$^{15}$)—, alkylene group, arylene group or a divalent connecting group comprising these groups in combination. R$^{14}$ represents a hydrogen atom, alkyl group, aryl group or aralkyl group. R$^{15}$ represents an alkyl group, aryl group or aralkyl group.

L preferably includes a single bond, —O—, —CO—, —NR$^{14}$—, —S—, —SO$_2$—, alkylene group or arylene group, particularly preferably —O—, —CO—, —NR$^{14}$—, alkylene group or arylene group.

In the case where L includes an alkylene group, the number of carbon atoms in the alkylene group is preferably from 1 to 10, more preferably from 1 to 8, particularly preferably from 1 to 6. Particularly preferred examples of the alkylene group include methylene group, ethylene group, trimethylene group, tetrabutylene group, and hexamethylene group.

In the case where L includes an arylene group, the number of carbon atoms in the arylene group is preferably from 6 to 24, more preferably from 6 to 18, particularly preferably from 6 to 12. Particularly preferred examples of the arylene group include phenylene group, and naphthalene group.

In the case where L includes a divalent connecting group obtained by combining alkylene group and arylene group (i.e., aralkylene group), the number of carbon atoms in the aralkylene group is preferably from 7 to 34, more preferably from 7 to 26, particularly preferably from 7 to 16. Particularly preferred examples of the aralkylene group include phenylenemethylene group, phenyleneethylene group, and methylenephenylene group.

The group exemplified as L may have substituents. Examples of these substituents include those exemplified above as substituents with reference to the group of substituents.

Specific examples of the structure of L will be given below, but the structure of L which can be employed in the invention is not limited thereto.

single bond L-1

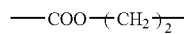 L-2

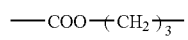 L-3

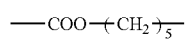 L-4

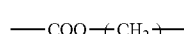 L-5

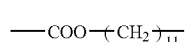 L-6

 L-7

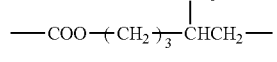 L-8

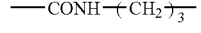 L-9

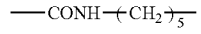 L-10

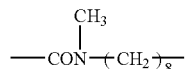 L-11

 L-12

-continued

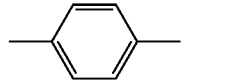 L-13

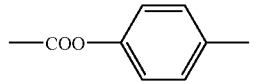 L-14

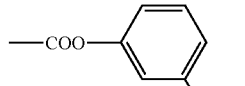 L-15

—COOCH$_2$CH$_2$OCH$_2$— L-16

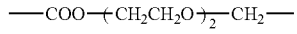 L-17

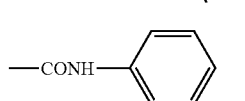 L-18

 L-19

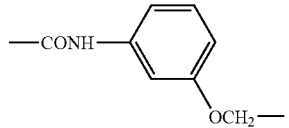 L-20

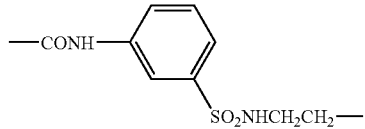 L-21

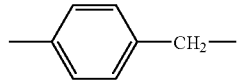 L-22

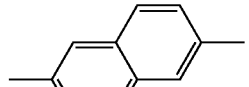 L-23

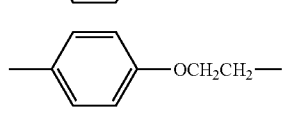 L-24

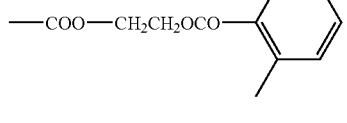 L-25

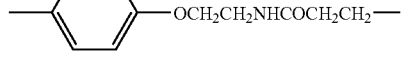 L-26

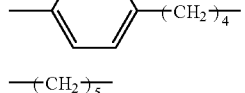 L-27

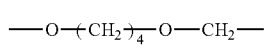

Q represents a carboxyl group, salt of carboxyl group (e.g., lithium salt, sodium salt, potassium salt, ammonium salt (e.g., ammonium, tetramethyl ammonium, trimethyl-2-hydroxyethyl ammonium, tetrabutyl ammonium, trimethylbenzyl ammonium, dimethylphenyl ammonium), pyridinium salt), sulfo group, salt of sulfo group (Examples of the cation forming the salt include those exemplified above with reference to carboxyl group), phosphoryl group or salt of phosphoryl group (Examples of the cation forming the salt include those exemplified above with reference to carboxyl group), preferably carboxyl group, sulfo group or phospho group, particularly preferably carboxyl group or sulfo group.

One repeating unit represented by the formula [4] to be incorporated in the polymer latex may exist singly. Alternatively, two or more such repeating units may exist at the same time.

Specific examples of the monomer represented by the formula [1], [2] or [3] will be given below, but the monomer which can be employed in the invention is not limited thereto.

A-1

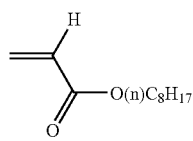

A-2

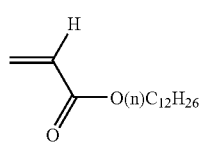

A-3

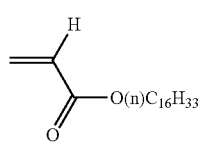

A-4

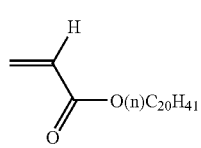

A-5

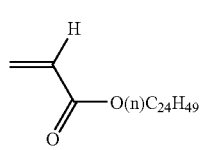

A-6

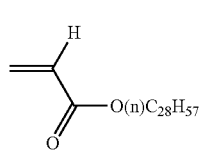

A-7

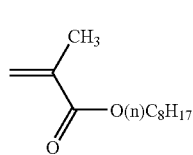

-continued

A-8

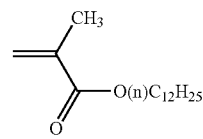

A-9

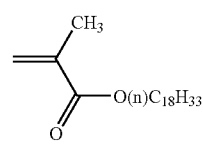

A-10

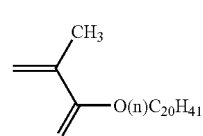

A-11

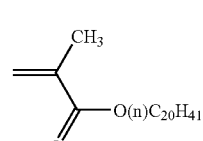

A-12

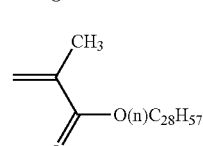

A-13

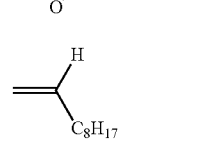

A-14

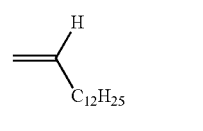

A-15

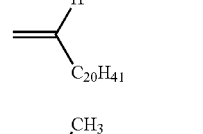

A-16

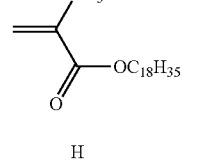

A-17

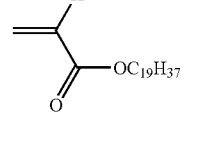

A-18

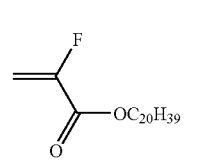

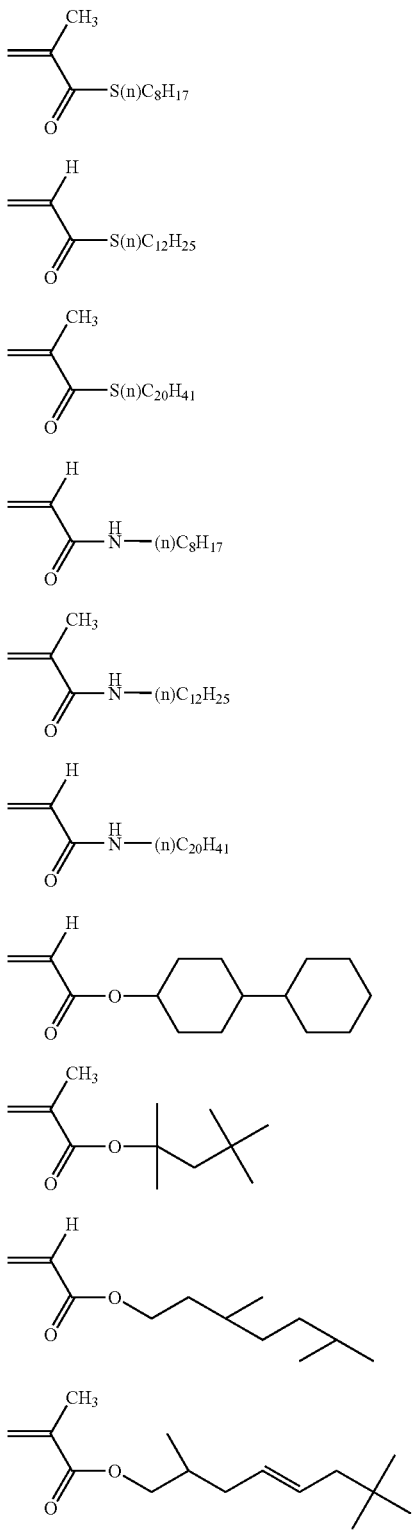

The polymer latex to be used in the present invention may comprise a copolymer of a monomer represented by the formula [1] and the other kind of monomers which can be polymerized with the monomer. These monomers are not specifically limited. As monomers which can be polymerized by ordinary radical polymerization or ionic polymerization method there can be preferably used the following monomer groups (a) to (j). These monomers can be independently and freely combined to synthesize polymer latexes.

—Monomer Groups (a) to (j)—

(a) Conjugated dienes: 1,3-pentadiene, isoprene, 1-phenyl-1,3-butadiene, 1-α-naphthyl-1,3-butadiene, 1-β-naphthyl-1,3-butadiene, cyclopentadiene (b) Olefins: ethylene, propylene, vinyl chloride, vinylidene chloride, 6-hydroxy-1-hexene, 4-pentenic acid, methyl 8-nonenate, vinylsulfonic acid, trimethylvinyl silane, trimethoxyvinyl silane, 1,4-divinylcyclohexane, 1,2,5-trivinyl-cyclohexane (c) α,β-Unsaturated carboxylic acid esters: alkyl acrylate (e.g., methyl acrylate, ethyl acrylate, butyl acrylate, cyclohexyl acrylate, 2-ethylhexyl acrylate, dodecyl acrylate), substituted alkyl acrylate (e.g., benzyl acrylate, 2-cyanoethyl acrylate), alkyl methacrylate (e.g., methyl methacrylate, butyl methacrylate, 2-ethylhexyl methacrylate, dodecyl methacrylate), substituted alkyl methacrylate (e.g., 2-hydroxyethyl methacrylate, glycidyl methacrylate, glycerin monomethacrylate, 2-acetoxyethyl methacrylate, tetrahydrofurfuryl methacrylate, 2-methoxyethyl methacylate, polypropylene glycol monomethacrylate (number of added moles of polyoxypropylene: 2 to 100), 3-N,N-dimethyl aminopropyl methacrylate, ammonoisopropyl methacrylate, 2-carboxyethyl methacrylate, 3-sulfopropyl methacrylate, 4-oxysulfobutyl methacrylate, 3-trimethoxysilylpropyl methacrylate, allyl methacrylate, 2-isocyanatoethyl methacrylate), unsaturated dicarboxylic acid derivative (e.g., monobutyl maleate, dimethyl maleate, monomethyl itaconate, dibutyl itaconate), multifunctional esters (e.g., ethylene glycol diacrylate, ethylene glycol dimethacrylate, 1,4-cyclohexane diacrylate, pentaerythritol tetramethacrylate, pentaerythritol triacrylate, trimethylolpropane triacrylate, trimethylolethane triacrylate, dipentaerythritol pentamethacrylate, pentaerythritol hexaacrylate, 1,2,4-cyclohexane tetramethacrylate)

(d) β-Unsaturated carboxylic acid amides: acrylamide, methacrylamide, N-methylacrylamide, N,N-dimethylacrylamide, N-methyl-N-hydroxyethyl methacrylamide, N-tert-butylacrylamide, N-tert-octyl methacrylamide, N-cyclohexylacrylamide, N-phenyl acrylamide, N-(2-acetoacetoxyethyl) acrylamide, N-acryloylmorpholine, diacetone acrylamide, diamide itaconate, N-methyl maleimide, 2-acrylamide-methylpropanesulfonic acid, methylene bisacrylamide, dimethacryloylpiperadine (e) Unsaturated nitriles: acrylonitrile, methacrylonitrile (f) Styrenes and derivatives thereof: styrene, vinyltoluene, p-tert-butylstyrene, vinylbenzoic acid, methyl vinylbenzoate, α-methylstyrene, vinylnaphthalene, p-hydroxymethylstyrene, sodium p-styrenesulfonate, potassium p-Styrene sulfinate, p-aminomethylstyrene, 1,4-divinylbenzene (g) Vinylethers: methyl vinyl ether, butyl vinyl ether, methoxy ethyl vinyl ether (h) Vinyl esters: vinyl acetate, vinyl propionate, vinyl benzoate (i) Other polymerizable monomers: N-vinyl imidazole, 4-vinylpyridine, N-vinylpyrrolidone, 2-vinyl oxazoline, 2-isopropenyloxazoline, divinylsulfone The number-average molecular weight of the polymer to be incorporated in the polymer latex of the invention is normally from 5,000 to 100,000, preferably from 10,000 to 500,000.

<Polymer Latex>

The polymer latex is a dispersion of a water-insoluble hydrophobic polymer in a water-soluble medium as particulate material. Referring to the state of dispersion, the particulate polymer may be emulsified, emulsion-polymerized or micelle-dispersed in the dispersion medium. Alternatively, the polymer molecule may have a partial hydrophilic structure so that the molecular chain itself is molecularly dispersed. For the details of polymer latexes to be used herein, reference can be made to Taira Okuda and Hiroshi Inagaki, "Gousei Jushi Emarujon (Synthetic Resin Emulsion)", Kobunshi Kankoukai, 1978, Takaaki Sugimura, Haruo Kataoka, Soichi Suzuki, Keiji Kasaharam "Gosei Ratekkusu no Oyo (Application of Synthetic Latexes)", Kobunshi Kankoukai, 1993, Soichi Muroi, "Gosei Ratekkusu no Kagaku (Chemistry of Synthetic Latexes)", Kobunshi Kankoukai, 1970, Yoshiaki Miyosawa, "Suisei Kotingu Zairyo no Kaihatsu to Oyo (Development and Application of Aqueous Coating Materials)", CMC, 2004, JP-A-64-538, etc. The average particle size of the dispersed particles is preferably from about 1 nm to 50,000 nm, more preferably from about 5 nm to 1,000 nm. The distribution of particle size of dispersed particles is not specifically limited. The dispersed particles may have a broad particle size distribution or a monodisperse particle size distribution.

The polymer latex may be one other than polymer latex having an ordinary uniform structure, i.e., so-called core/shell latex. In this structure, the core and the shell may have different glass transition temperatures to advantage. The glass transition temperature of the polymer latex of the present invention is preferably from −30° C. to 100° C., more preferably from 0° C. to 80° C., more preferably from 10° C. to 70° C., particularly preferably from 15° C. to 60° C.

These polymers to be used in the present invention may be straight-chain polymers, branched polymers, crosslinked polymers, so-called homopolymers obtained by polymerization of single monomer or copolymers obtained by polymerization of two or more monomers. In the case where the polymers are copolymers, they may be random copolymers or block copolymers. These copolymers each have a number-average molecular weight of from 5,000 to 1,000,000, preferably from 10,000 to 500,000. When the molecular weight of these copolymers is too small, the dynamic strength of the layer containing the polymer latex is insufficient. On the other hand, when the molecular weight of these copolymers is too great, the polymer latex has deteriorated film-forming properties to disadvantage. Further, crosslinkable polymer latexes are preferably used.

Specific examples of the structure of the polymer which can be used in the invention will be given below, but the polymer which can be used in the invention is not limited thereto. The figures in these formulae each indicate the proportion of the various monomer components by mass. Mw represents the weight-average molecular weight.

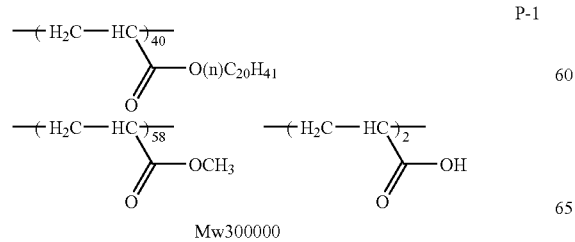

P-1

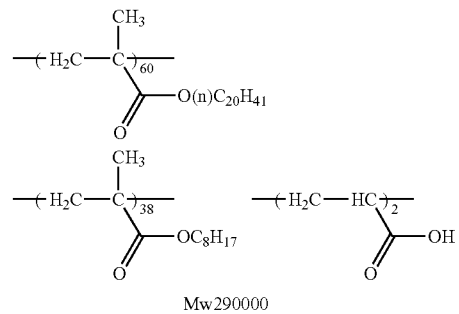

P-2

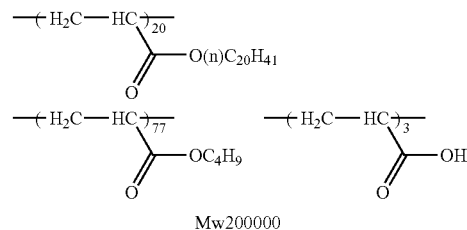

P-3

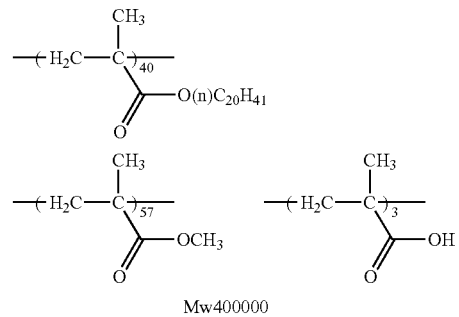

P-4

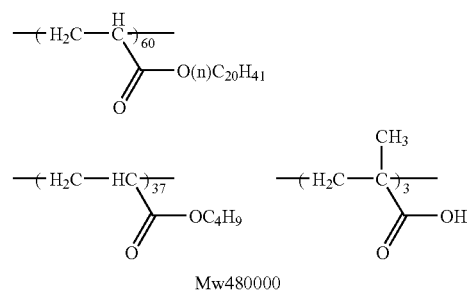

P-5

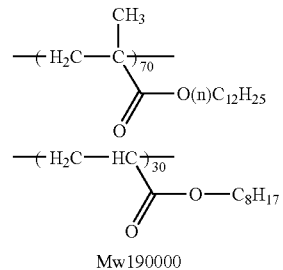

P-6

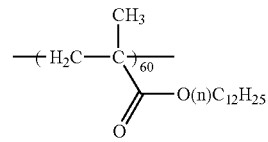

P-7

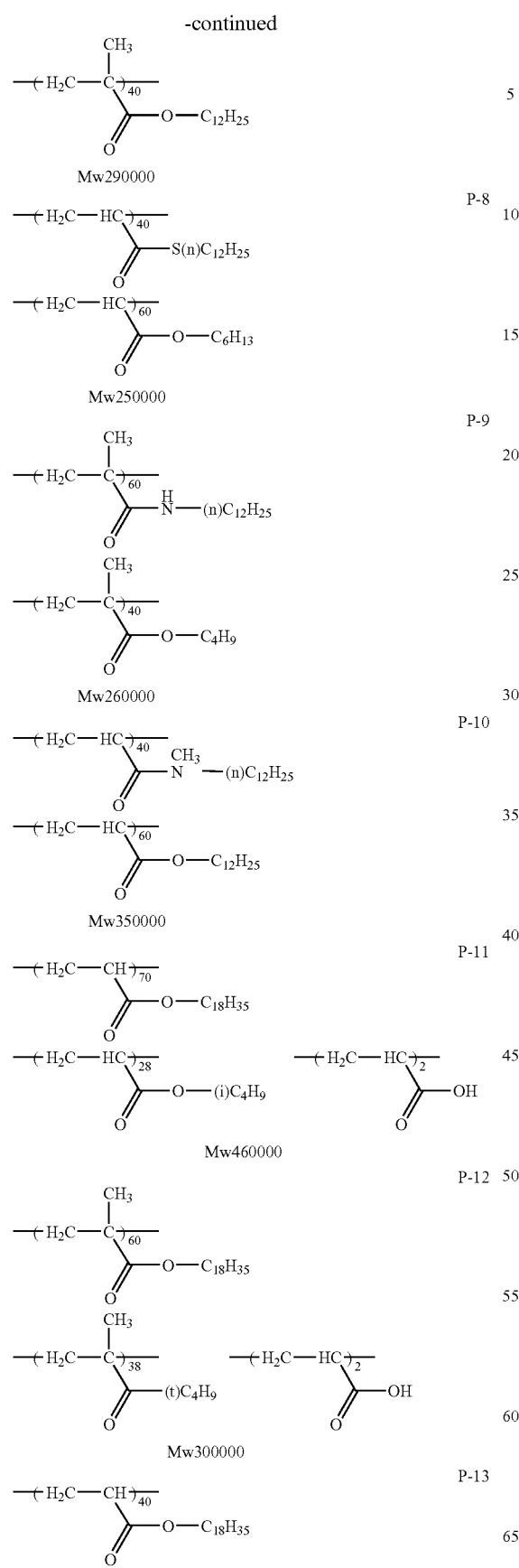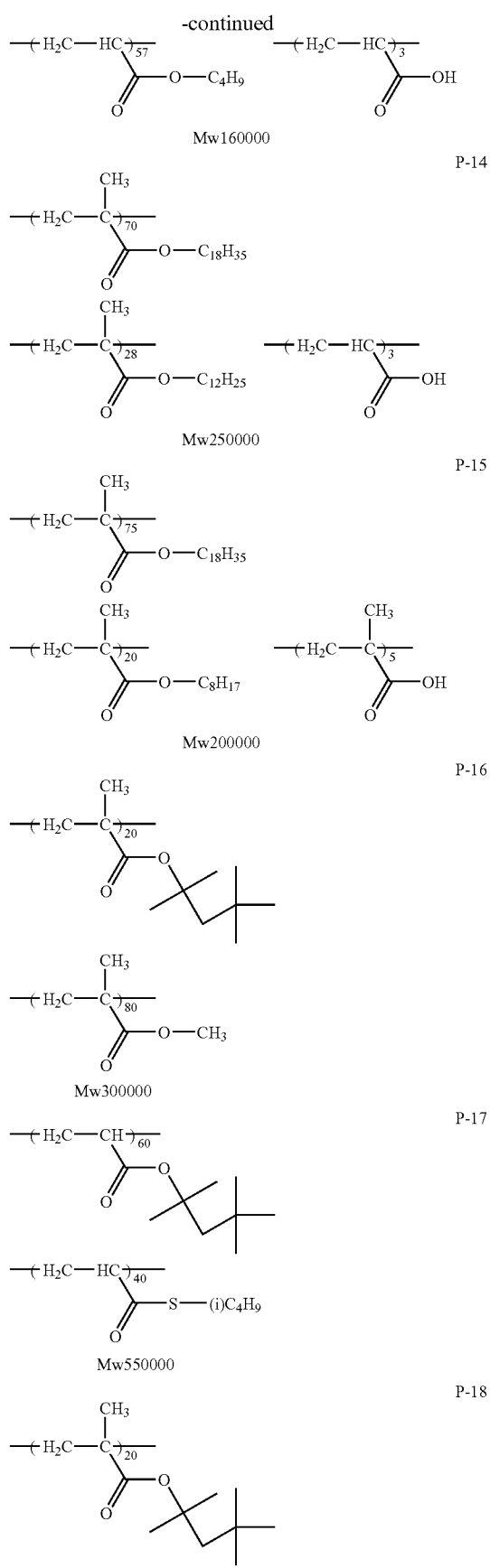

-continued
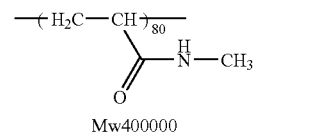
Mw400000
P-19
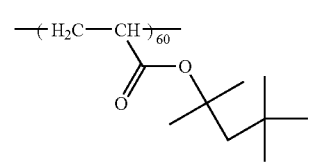
Mw400000
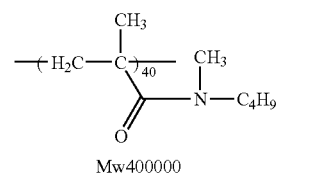
Mw290000
P-21
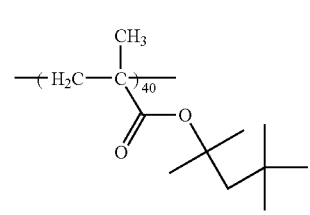
Mw480000
P-22
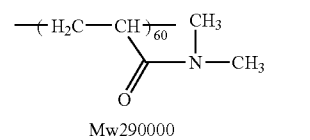
Mw390000
P-23
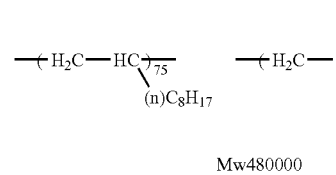
Mw440000
P-24
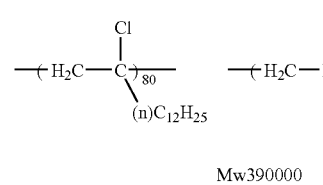
Mw280000
-continued
P-25
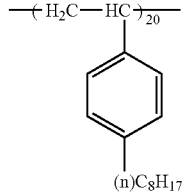
Mw280000
P-26
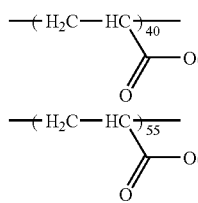
Mw300000
P-27
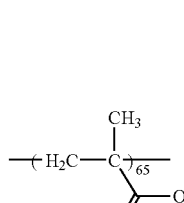
Mw350000
P-28
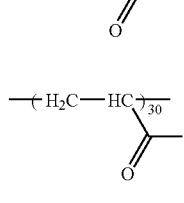
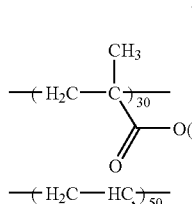
Mw400000
P-29
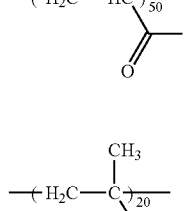

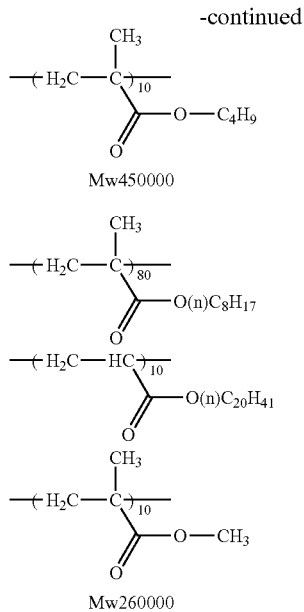

P-30

These polymer latexes may be used singly or in a blend of two or more thereof.

The polymer latexes to be used herein are commercially available. As these commercially available products there can be used the following polymers. Examples of the acrylic polymers employable herein include Cevian A-4635, 4718 and 4601 (produced by Daicel Polymer Ltd.), Nipol Lx811, 814, 821, 820, 855 (P-17: Tg 36° C.) and 857x2 (P-18: Tg 43° C.) (produced by ZEON CORPORATION), Voncoat R3370 (P-19: Tg 25° C.), 4280 (P-20: Tg 50° C.) (produced by DAINIPPON INK AND CHEMICALS, INCORPORATED), Jurimer ET-410 (P-21: Tg 44° C.) (produced by Nihon Junyaku Co., Ltd.), AE116 (P-22: Tg 50° C.), AE119 (P-23: Tg 55° C.), AE121 (P-24: Tg 58° C.), AE125 (P-25: Tg 60° C.), AE134 (P-26: Tg 48° C.), AE137 (P-27: Tg 48° C.), AE140 (P-28: Tg 53° C.) and AE173 (P-29: Tg 60° C.) (produced by JSR Co., Ltd.), Aron A-104 (P-30: Tg 45° C.) (produced by TOAGOSEI CO., LTD.), NS-600X and NS-620X (produced by TAKAMATSU OIL & FAT CO., LTD.), and Vinyblan 2580, 2583, 2641, 2770, 2770H, 2635, 2886, 5202C and 2706 (produced by NISSIN CHEMICAL INDUSTRY CO., LTD.) (All these compounds are represented by trade name).

Examples of polyesters employable herein include FINE-TEX ES650, 611, 675 and 850 (produced by DAINIPPON INK AND CHEMICALS, INCORPORATED), WD-size and WMS (produced by Eastman Chemical Co., Ltd.), A-110, A-115GE, A-120, A-121, A-124GP, A-124S, A-160P, A-210, A-215GE, A-510, A-513E, A-515GE, A-520, A-610, A-613, A-615GE, A-620, WAC-10, WAC-15, WAC-17XC, WAC-20, S-110, S-110EA, S-111SL, S-120, S-140, S-140A, S-250, S-252G, S-250S, S-320, S-680, DNS-63P, NS-122L, NS-122LX, NS-244LX, NS-140L, NS-141LX and NS-282LX (produced by TAKAMATSU OIL & FAT CO., LTD.), Aronmelt PES-1000 Series and PES-2000 Series (produced by TOAGOSEI CO., LTD.), Vylonal MD-1100, MD-1200, MD-1220, MD-1245, MD-1250, MD-1335, MD-1400, MD-1480, MD-1500, MD-1930 and MD-1985 (produced by TOYOBO CO., LTD.), and Sepoljon ES (produced by Sumitomo Seika Chemicals Co., Ltd.) (All these compounds are represented by trade name).

Examples of polyurethanes employable herein include HYDRAN AP10, AP20, AP30, AP40, 101H, Vondic 1320NS and 1610NS (produced by DAINIPPON INK AND CHEMICALS, INCORPORATED), D-1000, D-2000, D-6000, D-4000 and D-9000 (produced by Dainichiseika Color & Chemicals Mfg. Co., Ltd.), NS-155X, NS-310A, NS-310X and NS-311X (produced by TAKAMATSU OIL & FAT CO., LTD.), and Elastron (produced by DAI-ICHI KOGYO SEIYAKU CO., LTD.) (All these compounds are represented by trade name).

Examples of rubbers employable herein include LACSTAR 7310K, 3307B, 4700H and 7132C (produced by DAINIPPON INK AND CHEMICALS, INCORPORATED), and Nipol Lx416, LX410, LX430, LX435, LX110, LX415A, LX438C, 2507H, LX303A, LX407BP Series, V1004 and MH5055 (produced by ZEON CORPORATION) (All these compounds are represented by trade name).

Examples of polyvinyl chlorides employable herein include G351 and G576 (produced by ZEON CORPORATION), and Vinyblan 240, 270, 277, 375, 386, 609, 550, 601, 602, 630, 660, 671, 683, 680, 680S, 681N, 685R, 277, 380, 381, 410, 430, 432, 860, 863, 865, 867, 900, 900GT, 938 and 950 (produced by NISSIN CHEMICAL INDUSTRY CO., LTD.) (All these compounds are represented by trade name). Examples of polyvinylidene chlorides employable herein include L502 and L513 (produced by Asahi Kasei Corporation), and D-5071 (produced by DAINIPPON INK AND CHEMICALS, INCORPORATED) (All these compounds are represented by trade name). Examples of polyolefins employable herein include CHEMIPEARL S120, SA100 and V300 (P-40: Tg 80° C.) (produced by Mitsui Petrochemical Co., Ltd.), Voncoat 2830, 2210 and 2960 (produced by DAINIPPON INK AND CHEMICALS, INCORPORATED), and ZAIKTHENE and Sepoljon G (produced by Sumitomo Seika Chemicals Co., Ltd.). Examples of copolymerized nylons employable herein include Sepoljon PA (produced by Sumitomo Seika Chemicals Co., Ltd.) (All these compounds are represented by trade name).

Examples of polyvinyl acetates employable herein include Vinyblan 1080, 1082, 1085W, 1108W, 1108S, 1563M, 1566, 1570, 1588C, A22J7-F2, 1128C, 1137, 1138, A20J2, A23J1, A23J1, A23K1, A23P2E, A68J1N, 1086A, 1086, 1806D, 1108S, 1187, 1241LT, 1580N, 1083, 1571, 1572, 1581, 4465, 4466, 4468W, 4468S, 4470, 4485LL, 4495LL, 1023, 1042, 1060, 1060S, 1080M, 1084W, 1084S, 1096, 1570K, 1050, 1050S, 3290, 1017AD, 1002, 1006, 1008, 1107L, 1225, 1245L, GV-6170, GV-6181, 4468W and 4468S (produced by NISSIN CHEMICAL INDUSTRY CO., LTD.) (All these compounds are represented by trade name).

The lowest film-forming temperature (MFT) of the polymer latex is preferably from about −30° C. to 90° C., more preferably from about 0° C. to 70° C. In order to control the lowest film-forming temperature of the polymer latex, the polymer latex may comprise a film-forming aid incorporated therein. The film-forming aid is also called a temporary plasticizer and is an organic compound (normally in the form of organic solvent) which lowers the lowest film-forming temperature of the polymer latex. The film-forming aid is described in, e.g., Soichi Muroi, "Gosei Ratekkusu no Kagaku (Chemistry of Synthetic Latexes)", Kobunshi Kankokai, 1970. Preferred examples of the film-forming aid include the following compounds, but the compounds employable herein are not limited to the following specific examples.

Z-1: Benzyl alcohol
Z-2: 2,2,4-Trimethylpentanediol-1,3-monoisobutyrate
Z-3: 2-Dimethylaminoethanol
Z-4: Diethylene glycol In the present invention, the aforementioned polymer may be used in combination with any polymers so far as the effect of the present cannot be excessively impaired. The polymers which can be used in combination herein are preferably transparent or semitransparent and colorless. Examples of these polymers include natural resins, polymers and copolymers, synthetic polymers and copolymers, and other film-forming media, e.g., gelatins, polyvinyl alcohols, hydroxyethyl celluloses, cellulose acetates, cellulose acetate butyrates, polyvinylpyrrolidones, casein, starch, polyacrylic acids, polymethyl methacrylates, polyvinyl chlorides, polymethacrylic acids, styrene-maleic anhydride copolymers, styrene-acrylonitrile copolymers, styrene-butadiene copolymers, polyvinyl acetals (e.g., polyvinyl formal, polyvinyl butyral), polyesters, polyurethanes, phenoxy resins, polyvinyl chlorides, polyepoxides, polycarbonates, polyvinyl acetates, polyolefins, polyamides. The binder film may be formed from water, organic solvent or emulsion.

The polymer to be used in the present invention preferably exhibits a glass transition temperature (Tg) of from −30° C. to 70° C., more preferably from −10° C. to 50° C., even more preferably from 0° C. to 40° C. from the standpoint of work brittleness and image storage properties. As the binder there may be used a blend of two or more polymers. In this case, Tg obtained by weighted-averaging Tg of the various polymers taking into account the composition preferably falls within the above defined range. In the case where phase separation occurs or the binder has a core-shell structure, weighted-averaged Tg preferably falls within the above defined range.

The glass transition temperature (Tg) can be calculated by the following formula.

$$1/Tg = \Sigma(Xi/Tgi)$$

wherein the polymer is obtained by the copolymerization of monomer components in a number of n (i=1 to n). Xi represents the mass fraction of i-th monomer ($\Sigma Xi=1$). Tgi represents the glass transition temperature (absolute temperature) of homopolymer of i-th monomer. $\Sigma$ represents the sum of (Xi/Tgi) from i of 1 to n. For the glass transition temperature (Tgi) of homopolymer of the various monomers, reference can be made to J. Brandrup, E. H. Immergut, "Polymer Handbook (3rd Edition)", Wiley-Interscience, 1989.

The polymer to be used in the binder of the present invention can be easily obtained by solution polymerization method, suspension polymerization method, emulsion polymerization method, dispersion polymerization method, anionic polymerization method, cationic polymerization method or the like. Most desirable among these polymerization methods is emulsion polymerization because the polymer can be obtained in the form of latex. Also, a method is preferably used which comprises preparing a polymer in a solution, neutralizing the polymer or adding an emulsifier to the polymer, adding water to the polymer, and then forcedly stirring the mixture to prepare an aqueous dispersion. The emulsion polymerization is carried out by allowing a mixture of a dispersing medium such as water or a mixture thereof with a water-miscible organic solvent (e.g., methanol, ethanol, acetone) with a monomer in an amount of from 5% to 150% by mass based on the amount of the dispersing medium to undergo polymerization with stirring in the presence of an emulsifier and a polymerization initiator based on the total amount of the monomers at a temperature of from about 30° C. to 100° C., preferably from 60° C. to 90° C. for 3 to 24 hours. The various conditions such as the kind of dispersant to be used, the monomer concentration, the amount of initiator, the amount of emulsifier, the amount of dispersant, the reaction temperature and the method for adding monomer may be properly predetermined taking into account the kind of the monomers used. It is also preferred that a dispersant be used as necessary.

The emulsion polymerization can be normally carried out by the method disclosed in Taira Okuda and Hiroshi Inagaki, "Gousei Jushi Emarujon (synthetic Resin Emulsion)", Kobunshi Kankoukai, 1978, Takaaki Sugimura, Haruo Kataoka, Soichi Suzuki, Keiji Kasaharam "Gosei Ratekkusu no Oyo (Application of Synthetic Latexes)", Kobunshi Kankoukai, 1993, Soichi Muroi, "Gosei Ratekkusu no Kagaku (Chemistry of Synthetic Latexes)", Kobunshi Kankoukai, 1970, etc. As the emulsion polymerization method for synthesizing the polymer latex to be used in the present invention there may be selected collective polymerization method, monomer addition (continuous or batchwise) method, emulsion addition method, seed polymerization method, etc. Preferred among these polymerization methods from the standpoint of productivity of latex are collective polymerization method, monomer addition (continuous or batchwise) method and emulsion addition method.

As the aforementioned polymerization initiator there may be used any polymerization initiator capable of generating radicals. Examples of the polymerization initiator employable herein include inorganic peroxides such as persulfate and hydrogen peroxide, peroxides as disclosed in a catalog of organic peroxides published by NOF CORPORATION, and azo compounds as disclosed in a catalog of azo polymerization initiator published by Wako Pure Chemical Industries, Ltd. Preferred among these polymerization initiators are water-soluble peroxides such as persulfate and water-soluble azo compounds as disclosed in a catalog of azo polymerization initiator published by Wako Pure Chemical Industries, Ltd. More desirable among these polymerization initiators are ammonium persulfate, sodium persulfate, potassium persulfate, azobis(2-methylpropionamizine) hydrochloride, azobis(2-methyl-N-(2-hydroxyethyl) propionamide) and azobiscyanovaleric acid. Particularly preferred among these polymerization initiators are persulfates such as ammonium persulfate, sodium persulfate and potassium persulfate from the standpoint of image storage properties, solubility and cost.

The amount of the aforementioned polymerization initiator to be added is preferably from 0.3% to 2.0% by mass, more preferably from 0.4% to 1.75% by mass, particularly preferably from 0.5% to 1.5% by mass based on the total amount of the monomers.

As the aforementioned polymerization emulsifier there may be used any of anionic surface active agents, nonionic surface active agents, cationic surface active agents and amphoteric surface active agents. Preferred among these polymerization emulsifiers are anionic surface active agents from the standpoint of dispersibility and image storage properties. More desirable among these anionic surface active agents are sulfonic acid type anionic surface active agents because they can be used in a small amount to assure polymerization stability and have hydrolyzation resistance. Even more desirable among these sulfonic acid type anionic surface active agents are long-chain alkyldiphenyletherdisulfonic acid such as PELEX SS-H (trade name; produced by Kao Corporation). Particularly desirable are low electrolyte type such as Pionin A-43-S (trade name; produced by TAKEMOTO OIL & FAT Co., Ltd.).

As the aforementioned polymerization emulsifier there is preferably used a sulfonic acid type anionic surface active agent in an amount of from 0.1% to 10.0% by mass, more preferably from 0.2% to 7.5% by mass, particularly preferably from 0.3% to 5.0% by mass based on the total amount of the monomers.

For the synthesis of the polymer latex to be used in the present invention, a chelating gent is preferably used. A chelating agent is a compound capable of chelating polyvalent ions such as metal ion, e.g., ferric or ferrous ion and alkaline earth metal ion, e.g., calcium ion. Examples of the chelating agent employable herein include compounds as disclosed in JP-B-6-8956, U.S. Pat. No. 5,053,322, JP-A-4-73645, JP-A-4-127145, JP-A-4-247073, JP-A-4-305572, JP-A-6-11805, JP-A-5-173312, JP-A-5-66527, JP-A-5-158195, JP-A-6-118580, JP-A-6-110168, JP-A-6-161054, JP-A-6-175299, JP-A-6-214352, JP-A-7-114161, JP-A-7-114154, JP-A-7-120894, JP-A-7-199433, JP-A-7-306504, JP-A-9-43792, JP-A-8-314090, JP-A-10-182571, JP-A-10-182570, JP-A-11-190892, and JP-A-11-190892.

Preferred examples of the aforementioned chelating agents employable herein include inorganic chelate compounds (e.g., sodium tripolyphosphate, sodium hexamethaphosphate, sodium tetrapolyphosphate), aminopolycarboxylic acid-based chelate compounds (e.g., nitrilotriacetic acid, ethylenediaminetetraacetic acid), organic phosphonic acid-based chelate compounds (e.g., compounds disclosed in Research Disclosure No. 18170, JP-A-52-102726, JP-A-53-42730, JP-A-56-97347, JP-A-54-121127, JP-A-55-4024, JP-A-55-4025, JP-A-55-29883, JP-A-55-126241, JP-A-55-65955, JP-A-55-65956, JP-A-57-179843, JP-A-54-61125, West German Patent 1045373), polyphenolic chelating agents, and polyamine-based chelate compounds. Particularly preferred are aminopolycarboxylic acid derivatives.

Preferred examples of the aforementioned aminopolycarboxylic acid derivatives employable herein include compounds set forth in the attached table in "EDTA (—Chemistry of Complexanes)", Nankodo, 1977. Further examples of the aminopolycarboxylic acid derivatives include those obtained by substituting some of carboxylic groups in the above exemplified compounds by salt of alkaline metal such as sodium and potassium and ammonium salt or the like. Particularly preferred examples of the aminopolycarboxylic acid derivative employable herein include iminodiacetic acid, N-methyl iminodiacetic acid, N-(2-aminoethyl)iminodiacetic acid, N-(carbamoylmethyl)iminodiacetic acid, nitrilotriacetic acid, ethylenediamine-N,N'-diacetic acid, ethylenediamine-N,N'-di-α-propionic acid, ethylenediamine-N,N'-di-β-propionic acid, N,N'-ethylene-bis(α-o-hydroxyphenyl)glycine, N,N'-di(2-hydroxybenzyl)ethylenediamine-N,N'-diacetic acid, ethylenediamine-N,N'-diacetic acid-N,N'-diaceto hydroxamic acid, N-hydroxyethylethylenediamine-N,N',N'-triacetic acid, ethylenediamine-N,N,N',N'-tetraacetic acid, 1,2-propylenediamine-N,N,N',N'-tetraacetic acid, d,1-2,3-diaminobutane-N,N,N',N'-tetraacetic acid, meso-2,3-diaminobutane-N,N,N',N'-tetraacetic acid, 1-phenylethylenediamine-N,N,N',N'-tetraacetic acid, d,1-1,2-diphenylethylenediamine-N,N,N',N'-tetraacetic acid, 1,4-diaminobutane-N,N,N',N'-tetraacetic acid, trans-cyclobutane-1,2-diamine-N,N,N',N'-tetraacetic acid, trans-cyclopentane-1,2-diamine-N,N,N',N'-tetraacetic acid, trans-cyclohexane-1,2-diamine-N,N,N',N'-tetraacetic acid, cis-cyclohexane-1,2-diamine-N,N,N',N'-tetraacetic acid, cyclohexane-1,3-diamine-N,N,N',N'-tetraacetic acid, cyclohexane-1,4-diamine-N,N,N',N'-tetracetic acid, o-phenylenediamine-N,N,N',N'-tetraacetic acid, cis-1,4-diaminobutene-N,N,N',N'-tetraacetic acid, trans-1,4-diaminobutene-N,N,N',N'-tetraacetic acid, α,α'-diamino-o-xylene-N,N,N',N'-tetraacetic acid, 2-hydroxy-1,3-propanediamine-N,N,N',N'-tetraacetic acid, 2,2'-oxy-bis(ethyliminodiacetic acid), 2,2'-ethylenedioxy-bis(ethyliminodiacetic acid), ethylenediamine-N,N'-diacetic acid-N,N'-di-β-propionic acid, ethylenediamine-N,N'-diacetic acid-N,N'-di-β-propionic acid, ethylenediamine-N,N,N',N'-tetrapropionic acid, diethylenetriamine-N,N,N',N'',N''-pentaacetic acid, triethylenetetramine-N,N,N',N'',N''',N'''-hexaacetic acid, and 1,2,3-triaminopropane-N,N,N',N',N''',N'''-hexaacetic acid. Further examples of the aminopolycarboxylic acid derivative employable herein include those obtained by substituting some of carboxylic groups in the above exemplified compounds by salt of alkaline metal such as sodium and potassium with ammonium or the like.

The amount of the aforementioned chelating agent to be added is preferably from 0.01% to 0.4% by mass, more preferably from 0.02% to 0.3% by mass, particularly preferably from 0.03% to 0.15% by mass based on the total amount of the monomers. When the amount of the chelating agent to be added falls below 0.01% by mass, the metallic ions which have entered at the step of producing the polymer latex sometimes cannot be sufficiently caught, causing the drop of stability of latex to agglomeration and hence the deterioration of spreadability. On the other hand, when the amount of the chelating agent to be added exceeds 0.4% by mass, the resulting latex may exhibit a raised viscosity and hence a deteriorated spreadability.

The synthesis of the polymer latex to be used in the present invention is preferably effected in the presence of a chain transfer agent. As such a chain transfer agent there is preferably used one disclosed in "Polymer Handbook, 3rd edition", Wiley-Interscience, 1989. Sulfur compounds are more desirable because they have a high chain transfer capability and thus can be used in a small amount. Particularly desirable are hydrophobic mercaptane-based chain transfer agents such as tert-dodecylmercaptane and n-dodecylmercaptane.

The amount of the aforementioned chain transfer agent to be added is preferably from 0.2% to 2.0% by mass, more preferably from 0.3% to 1.8% by mass, particularly preferably from 0.4% to 1.6% by mass based on the total amount of the monomers.

For the emulsion polymerization, additives as disclosed in handbook of synthetic rubbers such as electrolyte, stabilizer, thickening agent, anti-foaming agent, oxidation inhibitor, vulcanizing agent, antifreezing agent, gelatinizing agent and vulcanization accelerator may be used besides the aforementioned compounds.

<Solvent>

The coating composition of the invention may comprise an aqueous solvent as a solvent. A water-miscible organic solvent may be additionally used. Examples of the water-miscible organic solvent employable herein include alcohol-based solvents such as methyl alcohol, ethyl alcohol and propyl alcohol, cellosolve-based solvents such as methyl cellosolve, ethyl cellosolve and butyl cellosolve, ethyl acetate, dimethyl formamide, diacetone alcohol, furfuryl alcohol, benzyl alcohol, diethylene glycol monoethyl ether, and oxyethyl phenyl ether. The amount of these organic solvents to be added is preferably 50% or less, more preferably 30% or less. The layer constituting the heat-sensitive transfer image-receiving sheet of the invention, particularly the receiving layer, is preferably formed by spreading an aqueous coating solution, and then drying the coat layer. The term "aqueous" as used herein is meant to indicate that 60% by mass or more of the solvent (dispersing medium) of the coating solution is water.

In the polymer latex of the invention, the concentration of the polymer is preferably from 10% to 70% by mass, more preferably from 20% to 60% by mass, particularly preferably from 30% to 55% by mass based on the latex solution.

The polymer in the image-receiving sheet of the invention may be in the state of gel or dried film formed by drying the spread of the coating composition containing the polymer latex of the invention so that the solvent is partly evaporated away.

The ink sheet produced from the coating composition of the invention will be further described hereinafter.

(Receiving Layer)

The receiving layer acts to receive a dye which has moved from the ink sheet and maintain the image thus formed. To this end, the receiving layer comprises a dyeable resin (dyeable receptive polymer).

The degree of dyeability with dyes is defined as follows. Four colors, i.e., yellow, magenta, cyan and black dyes are outputted onto the image-receiving sheet in such a manner that a 256-gradation solid image is formed. The image thus obtained is then measured for reflection density. The receptive polymer showing a high reflection density is defined to be a good receptive polymer. The dyeability of a receptive polymer can vary with the kind of the printer or ink sheet. Care must be taken in this point.

In some detail, the polymer latex to be incorporated in the coating composition of the invention can be exemplified as a preferred example of the receptive polymer.

<Ultraviolet Absorber>

The receiving layer may comprise an ultraviolet absorber incorporated therein to enhance the light-resistance of the heat-sensitive transfer image-receiving sheet. In this case, the ultraviolet absorber can be polymerized so that it can be fixed to the receiving layer, making it possible to prevent itself from being diffused in the ink sheet or sublimated or evaporated when heated.

As the ultraviolet absorber there may be used a compound having various ultraviolet absorber skeletons known widely in the art of data recording. Specific examples of such a compound include compounds having 2-hydroxybenzotriazole type ultraviolet absorber skeleton, 2-hydroxybenzotriazole type ultraviolet absorber skeleton and 2-hydroxybenzophenone type ultraviolet absorber skeleton. From the standpoint of ultraviolet absorbing properties (absorptivity coefficient) and stability, compounds having benzotriazole type and triazine type skeletons are desirable. From the standpoint of polymerization and latex formation, compounds having benzotriazole type and benzophenone type skeletons are desirable. In some detail, ultraviolet absorbers disclosed in JP-A-2004-361936 can be used.

The ultraviolet absorber to be used herein preferably has absorption in the ultraviolet range. Further, the edge of absorption preferably doesn't extend to the visible light range. In some detail, when the ultraviolet absorber is incorporated in the receiving layer to prepare a heat-sensitive transfer image-receiving sheet, the heat-sensitive transfer image-receiving sheet preferably exhibits a reflection density of Abs 0.5 or more at 370 nm, more preferably Abs 0.5 or more at 380 nm. It is also desirable that the reflection density at 400 nm be Abs 0.1 or less. When the reflection density at higher than 400 nm is high, the resulting image is tinged with yellow to disadvantage.

The ultraviolet absorber to be used in the present invention is preferably polymerized. The weight-average molecular weight of the ultraviolet absorber is preferably 10,000 or more, more preferably 100,000 or more. As a method for polymerizing the ultraviolet absorber there is preferably employed a method which comprises grafting the ultraviolet absorber on a polymer. The polymer which is used as a main chain preferably has a polymer skeleton having a poorer dyeing property than the receptive polymer used in combination therewith. The film formed by the polymer preferably has a sufficient strength. The percent grafting of the ultraviolet absorber on the polymer main chain is preferably from 5% to 20% by mass, more preferably from 8% to 15% by mass.

The polymer having an ultraviolet absorber grafted thereon is more preferably latexed. The latexing of the polymer makes it possible to form a receiving layer when an aqueous dispersion-based coating solution is spread and reduce the production cost. As a latexing method there may be used a method disclosed in Japanese Patent No. 3,450,339. As a latexed ultraviolet absorber there may be also used a commercially available ultraviolet absorber such as ULS-700, ULS-1700, ULS-1383MA, ULS-1635MH, XL-7016, ULS-933LP and ULS-935LH (All these products are available from Ipposha Oil Industries Co., Ltd.), and New Coat UVA-1025W, New Coat UVA-204W and New Coat UVA-4512M (All these products are available from Shin-nakamura Chemical Corporation).

In order to latex the polymer having an ultraviolet absorber grafted thereon, it can be mixed with a latex of the aforementioned dyeable receptive polymer before being spread to form a receiving layer having an ultraviolet absorber dispersed uniformly therein.

The added amount of the polymer having an ultraviolet absorber grafted thereon or its latex is preferably from 5 to 50 parts by mass, more preferably from 10 to 30 parts by mass based on the amount of the dyeable receptive polymer latex constituting the receiving layer.

<Release Agent>

The receiving layer may also comprise a release agent incorporated therein to prevent the heat fusion to the ink sheet during image formation. As such a release agent there may be used a silicone oil or phosphoric acid ester-based plasticizer or fluorine-based compound. A silicone oil is particularly preferably used. As such a silicone oil there is preferably used a modified silicone oil such as epoxy-modified silicone oil, alkyl-modified silicone oil, amino-modified silicone oil, carboxyl-modified silicone oil, alcohol-modified silicone oil, fluorine-modified silicone oil, alkyl aralkyl polyether-modified silicone oil, epoxy-polyether-modified silicone oil and polyether-modified silicone oil. In particular, a reaction product of a vinyl-modified silicone oil and a hydrogen-modified silicone oil is desirable. The amount of the release agent to be incorporated in the receiving layer is preferably from 0.2 to 30 parts by mass based on the amount of the receptive polymer.

The spread of the receiving layer is preferably from 0.5 to 10 g/m$^2$ (The spread will be represented in terms of solid content hereinafter unless otherwise specified). The thickness of the receiving layer is preferably from 1 μm to 20 μm.

(Interlayer)

An interlayer may be provided interposed between the receiving layer and the support. Examples of the interlayer include an underlayer and a heat insulating layer described later. The interlayer preferably contains gelatin. The proportion of gelatin in the coating solution of interlayer is preferably from 0.5% to 14% by mass, particularly preferably from 1% to 6% by mass.

(Underlayer)

An underlayer may preferably be formed between the receiving layer and the heat insulating layer. For example, a whiteness adjusting layer, charge adjusting layer, adhesive layer and primer layer are formed. These layers may have the same configuration as described in Japanese Patent No. 3585599 and Japanese Patent No. 2925244.

μm.

(Heat Insulating Layer)

The heat insulating layer (the hollow layer) acts to protect the support against heat developed during transfer under heating using a thermal head. Further, the heat insulating layer has a high cushioning effect and thus can form a heat-sensitive transfer image-receiving sheet having a high printing sensitivity even when paper is used as a support.

In the image-receiving sheet of the present invention, the heat insulating layer preferably contains a hollow polymer.

The hollow polymer in the present invention is a particulate polymer having a closed-cell pore in the interior thereof. Examples of such a hollow polymer include 1) non-foaming type hollow particle having water encapsulated inside a wall formed by a polystyrene, acrylic resin, styrene-acryl resin or the like which allows water in the interior thereof to be evaporated out of the particle to make the interior of the particle hollow when spread and dried, 2) foaming type microballoon having a low boiling liquid such as butane and pentane covered by any or a mixture of polymer of polyvinylidene chloride, polyacrylonitrile, polyacrylic acid and polyacrylic acid ester which allows the low boiling liquid in the interior thereof to foam to make the interior of the particle hollow when spread and heated, and 3) microballoon obtained by previously heating the microballoon (2) so that it foams to form a hollow polymer.

These hollow polymers preferably have a void of from about 20% to 70%. Two or more of these hollow polymers may be used in admixture as necessary. Specific examples of the aforementioned hollow polymer (1) include ROHPAC 1055 (produced by Rohm and Haas Company), Voncoat PP-1000 (produced by DAINIPPON INK AND CHEMICALS, INCORPORATED), SX866 (B) (produced by JSR Co., Ltd.), and Nipol MH5055 (produced by ZEON CORPORATION) (All these products are represented by trade name). Specific examples of the aforementioned hollow polymer (2) include F-30 and F-50 (produced by Matsumoto Yushi-Seiyaku Co., Ltd.) (All these products are represented by trade name). Specific examples of the aforementioned hollow polymer (3) include F-30E (produced by Matsumoto Yushi-Seiyaku Co., Ltd.), and Expancel 461DE, 551DE and 551DE20 (produced by Nippon Ferrite Co., Ltd.) (All these products are represented by trade name). The hollow polymer to be incorporated in the heat insulating layer may be latexed.

The interlayer containing a hollow polymer comprises a water-dispersible resin or water-soluble resin incorporated therein as a binder resin. Examples of the binder resin employable herein include known resins such as acrylic resin, styrene-acryl copolymer, polystyrene resin, polyvinyl alcohol resin, vinyl acetate resin, ethylene-vinyl acetate copolymer, vinyl chloride-vinyl acetate copolymer, styrene-butadiene copolymer, polyvinylidene chloride resin, cellulose derivative, casein, starch and gelatin. These resins may be used singly or in admixture.

The solid content of the hollow polymer in the heat insulating layer is preferably from 5 to 2,000 parts by mass when the solid content of the binder resin is 100 parts by mass. The weight proportion of the solid content of the hollow polymer in the coating solution is preferably from 1% to 70% by mass, more preferably from 10% to 40% by mass. When the weight proportion of the hollow polymer is too small, it may be the case where a sufficient heat insulation cannot be attained. On the other hand, when the weight proportion of the hollow polymer is too great, it may be the case where the bonding force between the hollow polymer particles can be lowered, causing dusting or film exfoliation during treatment.

The particle size of the hollow polymer is preferably from 0.1 μm to 20 μm, more preferably from 0.1 μm to 2 μm, particularly preferably from 0.1 μm to 1 μm. The glass transition temperature (Tg) of the hollow polymer is preferably 70° C. or more, more preferably 100° C. or more.

The heat insulating layer may be formed by a resin and a foaming agent. As the resin of the heat insulating layer there may be used any known resin such as urethane resin, acrylic resin, methacrylic resin and modified olefin resin or a blend thereof. The heat insulating layer is formed by spreading a coating solution obtained by dissolving and/or dispersing the resin in an organic solvent or water. The coating solution of the heat insulating layer is preferably an aqueous coating solution giving no effect on the foaming agent. Examples of the aqueous coating solution employable herein include water-soluble, water-dispersible or SBR latex, urethane emulsion, polyester emulsion, vinyl acetate emulsion, vinyl acetate copolymer emulsion, emulsion of acryl, acryl styrene or the like, vinyl chloride emulsion, and dispersion thereof. In the case where the microsphere described later is used as a foaming agent, preferred among these resins are vinyl acetate emulsion, vinyl acetate copolymer emulsion, and emulsion of acryl, acryl styrene or the like. The "water-soluble" in this specification means that a solubility to 100 g of water at 20° C. is at least 0.05 g, preferably at least 0.1 g, more preferably at least 0.5 g.

These resins can be easily controlled in its glass transition temperature, flexibility and film-forming properties by changing the kind and mixing proportion of the monomers to be copolymerized therewith. Accordingly, these resins are advantageous in that desired physical properties can be obtained without adding any plasticizer or film-forming aid and they undergo little color change during storage in various atmospheres after film formation and little change of physical properties with time. Among the aforementioned resins, SBR latex normally has a low glass transition temperature and thus can easily undergo blocking that causes yellowing during film formation or storage to disadvantage. Most urethane-based emulsions contain a solvent such as NMP and DMF that can easily give adverse effects on the foaming agent to disadvantage. Polyester emulsions or dispersions and vinyl chloride emulsions normally have a high glass transition temperature that causes the deterioration of foamability of microsphere to disadvantage. There are some soft emulsions or dispersions. However, these emulsions or dispersions are rendered flexible by the addition of a plasticizer. Thus, these emulsions or dispersions cannot be used preferably.

The foaming properties of the foaming agent are drastically affected by the hardness of the resin. In order that the foaming agent might expand to a desired foaming factor, a resin having a glass transition temperature of from −30° C. to 20° C. or a lowest film-forming temperature of 20° C. or less is preferably used. A glass having a glass transition temperature of 20° C. or more lacks flexibility and thus can cause the deterioration of foaming properties of the foaming agent. A resin having a glass transition temperature of −30° C. or less causes blocking due to adhesivity (occurring on the back surface of the foaming layer and the substrate when the substrate having the foaming layer formed thereon is wound) or causes defects when the heat transfer image-receiving sheet is cut (when the image-receiving sheet is cut, of the resin of the foaming layer is attached to the cutter blade, causing deterioration of external appearance or deviation of dimension of cut). Further, a resin having a lowest film-forming temperature of 20° C. or more can cause defects in film formation during spreading/drying resulting in disadvantageous such as surface cracking.

Examples of the foaming agent employable herein include known foaming agents such as decomposable foaming agent including dinitropentamethylenetetramine, diazoaminobenzene, azobisisobutyronitrile, and azodicarboamide which decomposes to produce a gas such as oxygen, carbon dioxide and nitrogen when heated, and microsphere comprising a microcapsule having a low boiling liquid such as butane and pentane covered by a resin such as polyvinylidene chloride and polyacrylonitrile. Preferred among these known foaming agents is microsphere comprising a microcapsule having a low boiling liquid such as butane and pentane covered by a resin such as polyvinylidene chloride and polyacrylonitrile. These foaming agents expand when heated in the form of foaming layer. The foaming layer thus expanded has high cushioning properties and heat insulating properties. The amount of these foaming agents to be used is preferably from 0.5 to 100 parts by mass based on 100 parts by mass of the resin constituting the foaming layer. When the amount of these foaming agents to be used is 0.5 parts by mass or less, the resulting foaming layer exhibits low cushioning properties that can impair the effect of the foaming layer. When the amount of these foaming agents to be used is 100 parts by mass or more, the foaming layer thus expanded has too great a void and hence a deteriorated mechanical strength and thus cannot be normally handled. Further, the surface of the foaming layer loses smoothness, occasionally impairing the external appearance and print quality of the product. The thickness of the entire foaming layer is preferably from 30 µm to 100 µm. When the thickness of the foaming layer is 30 µm or less, the resulting foaming layer can lack cushioning properties or heat insulating properties. On the other hand, when the thickness of the foaming layer is 100 µm or more, the resulting foaming layer does not exhibit an enhanced effect and can show a strength drop. The particle size of the foaming agent is preferably from about 5 µm to 15 µm as calculated in terms of volume-average particle size before foaming and from 20 µm to 50 µm as calculated in terms of volume-average particle size after foaming. Those having a volume-average particle size of 5 µm or less before foaming or 20 µm or less after foaming can have low cushioning properties. Those having a volume-average particle size of 15 µm or more before foaming or not smaller than 20 µm to 50 µm after foaming can roughen the surface of the foaming layer, resulting in the adverse effects on the quality of the image thus formed.

Referring to the foaming agent, a low temperature foaming type microsphere having a membrane softening temperature and foaming starting temperature of 100° C. or less and an optimum foaming temperature (temperature at which the foaming factor reaches highest in 1 minute of heating) of 140° C. or less is preferably used to predetermine the heating temperature during foaming as low as possible. The use of a microsphere having a low foaming temperature makes it possible to prevent the occurrence of heat wrinkle or curling of the substrate during foaming. The microsphere having a low foaming temperature can be obtained by adjusting the amount of a thermoplastic resin constituting the membrane such as polyvinylidene chloride and polyacrylonitrile. The volume-average particle size of the microsphere is normally from 5 µm to 15 µm. The foaming layer comprising this microsphere is advantageous in that the foam obtained by foaming has a closed-cell structure, the foaming layer can easily expand at a simple step involving mere heating and the thickness of the foaming layer can be easily controlled by the mixing proportion of the microsphere.

However, this microsphere can be affected by organic solvents. Accordingly, when as the foaming layer coating solution there is used one comprising an organic solvent, the membrane of the microsphere is eroded by the organic solvent and thus exhibits deteriorated foaming properties. Thus, when the aforementioned microsphere is used, an aqueous coating solution free of organic solvent which erodes the membrane of the microsphere such as ketone, e.g., acetone, methyl ethyl ketone, ester, e.g., ethyl acetate and lower alcohol, e.g., methanol, ethanol is preferably used. Accordingly, an aqueous coating solution, particularly a coating of water-soluble or water-dispersible resin or resin emulsion, preferably acryl-styrene emulsion or modified vinyl acetate emulsion is preferably used. Even when such an aqueous coating solution is used to form a foaming layer, it a high boiling high polarity solvent such as NMP, DMF and cellosolve is incorporated in the aqueous coating solution as an auxiliary solvent, film-forming aid or plasticizer, the solvent can affect the microsphere. Thus, it is necessary to the formulation of the aqueous resin to be used and the added amount of the high boiling solvent be considered to confirm if the microcapsule can be adversely affected.

The spread of the aforementioned hollow polymer in the interlayer is preferably from 1 to 100 g/m$^2$, more preferably from 5 to 20 g/m$^2$.

The thickness of the interlayer containing a hollow polymer is preferably from 5 µm to 50 µm, more preferably from 5 µm to 40 µm.

(Support)

As the support for the heat-sensitive transfer image-receiving sheet in the present invention there may be used a coated paper or a WP paper (a double-side laminated paper).

<Coated Paper>

The aforementioned coated paper is obtained by coating a sheet such as raw paper with various resins, rubber latexes or polymer materials on one or both sides thereof. The spread amount of these coating compounds depends on the purpose. Examples of such a coated paper include art paper, cast-coated paper, and Yankee paper.

As the resin to be spread over the surface of the raw paper there is preferably used a thermoplastic resin. Examples of such a thermoplastic resin include the following thermoplastic resin (a) to (h).

(a) Copolymers of polyolefin resin such as polyethylene resin and polypropylene resin or olefin such as ethylene and propylene with other vinyl monomers, acrylic resins, etc.

(b) Thermoplastic resins having ester bond. Examples of such thermoplastic resins include polyester resins obtained by the condensation of dicarboxylic acid component (which may be substituted by sulfonic acid group, carboxyl group or the like) with alcohol component (which may be substituted by hydroxyl group or the like), polyacrylic acid ester resins or polymethacrylic acid ester resins such as polymethyl methacrylate, polybutyl methacrylate, polymethyl acrylate and polybutyl acrylate, polycarbonate resins, polyvinyl acetate resins, styrene acrylate resins, styrene-methacrylic acid ester copolymer resins, and vinyltoluene acrylate resins.

Specific examples of these thermoplastic resins include those disclosed in JP-A-59-101395, JP-A-63-7971, JP-A-63-7972, JP-A-63-7973, and JP-A-60-294862.

Examples of commercially available thermoplastic resins include VYLON 290, VYLON 200, VYLON 280, VYLON 300, VYLON 103, VYLON GK-140 and VYLON GK-130 (produced by (produced by TOYOBO CO., LTD.), Toughton NE-382, Toughton U-5, ATR-2009 and ART-2010 (produced by Kao Corporation), Elitel UE3500, UE3210, XA-8153, KZA-7049 and KZA-1449 (produced by UNITIKA LTD.), Polyestar TP-220 and R-188 (produced by Nippon Synthetic Chemical Industry Ltd.), and various thermoplastic resins of Hi-Ros Series produced by SEIKO PMC CORPORATION).

(c) Polyurethane resins, etc.

(d) Polyamide resins, urea resins, etc.

(e) Polysulfone resins, etc.

(f) Polyvinyl chloride resins, polyvinylidene chloride resins, vinyl chloride-vinyl acetate copolymer resins, vinyl chloride-vinyl propionate copolymer resins, etc.

(g) Polyol resins such as polyvinyl butyral, cellulose resins such as ethyl cellulose resin and cellulose acetate resins, etc.

(h) Polycaprolactone resins, styrene-maleic anhydride resins, polyacrylonitrile resins, polyether resins, epoxy resins, phenolic resins, etc.

The aforementioned thermoplastic resins may be used singly or in combination of two or more thereof.

The thermoplastic resins may optionally comprise a brightening agent, an electrically-conducting agent, a filler, a pigment or dye such as titanium oxide, ultramarine and carbon black or the like incorporated therein.

<Laminated Paper>

The aforementioned laminated paper is obtained by laminating various resins, rubbers, polymer sheets or films on a sheet such as raw paper. Examples of the aforementioned laminating materials employable herein include polyolefins, polyvinyl chlorides, polyethylene terephthalates, polystyrenes, polymethacrylates, polycarbonates, polyimides, and triacetyl celluloses. These resins may be used singly or in combination of two or more thereof.

The aforementioned polyolefin is often normally formed by a low density polyethylene. In order to enhance the heat resistance of the support, a polypropylene, a blend of polypropylene and polyethylene, a high density polyethylene, a blend of high density polyethylene and low density polyethylene or the like is preferably used. From the standpoint of cost, laminatability, etc. in particular, a blend of high density polyethylene and low density polyethylene is most desirable.

In the blend of high density polyethylene and low density polyethylene, the high density polyethylene and the low density are blended at a ratio of from 1/9 to 9/1, preferably from 2/8 to 8/2, more preferably from 3/7 to 7/3 (by weight). In the case where the thermoplastic resin layer is formed on the both sides of the support, the back side of the support is preferably formed by a high density polyethylene or a blend of a high density polyethylene and a low density polyethylene. The molecular weight of the polyethylene is not specifically limited. However, whichever it is a high density polyethylene or low density polyethylene, the polyethylene preferably has a melt index of from 1.0 to 40 g/10 minutes and a good extrudability.

These sheets or films may be treated to have white reflectivity. Examples of such treatment include a method involving the incorporation of a pigment such as titanium oxide in these sheets or films.

The thickness of the aforementioned support is preferably from 25 µm to 300 µm, more preferably from 50 µm to 260 µm, even more preferably from 75 µm to 220 µm. The rigidity of the support may vary depending on the purpose. As the support for electrophotographic image-receiving sheet for photographic image quality there is preferably used one similar to the support for color silver salt photograph.

(Curl Adjusting Layer)

When the support is exposed as it is, the heat-sensitive transfer image-receiving sheet can be curled due to moisture and heat in the atmosphere. Therefore, the support preferably has a curl adjusting layer formed on the back side thereof. The curl adjusting layer acts to not only prevent the curling of the image-receiving sheet but also protect the image-receiving sheet against water. As the curl adjusting layer there is used a polyethylene laminate, polypropylene laminate or the like. In some detail, the curl adjusting layer can be formed in the same manner as described in JP-A-61-110135, JP-A-6-202295, etc.

(Writing Layer, Charge Adjusting Layer)

The writing layer/charge adjusting layer can be made of an inorganic oxide colloid, ionic polymer or the like. As an antistatic agent there may be used any of cationic antistatic agents such as quaternary ammonium salt and polyamine derivative, anionic antistatic agents such as alkyl phosphate and nonionic antistatic agents such as aliphatic acid ester. In some detail, the writing layer/charge adjusting layer can be formed in the same manner as described in Japanese Patent No. 3,585,585, etc.

(Method for Producing Heat-Sensitive Transfer Image-Receiving Sheet)

The heat-sensitive transfer image-receiving sheet of the present can preferably be prepared by simultaneously spreading the receiving layer coating solution and at least one interlayer coating solution over a support.

In the case where a multi-layer image-receiving sheet composed of a plurality of layers having different functions (e.g., foam layer, heat insulating layer, interlayer, receiving layer) is formed on the support, a method is known which comprises successively spreading the various layer coating solutions over the support or laminating supports having the respective layer coating solution spread thereon on each other as disclosed in JP-A-2004-106283, JP-A-2004-181888, JP-A-2004-345267, etc. In the art of photography, on the other hand, a method is known which comprises simultaneously spreading a plurality of layer coating solutions to drastically enhance productivity. So-called slide coating method and curtain coating method are known as disclosed in U.S. Pat. Nos. 2,761,791, 2,681,234, 3,508,947, 4,457,256 and 3,993,019, JP-A-63-54975, JP-A-61-278848, JP-A-55-86557, JP-A-52-31727, JP-A-55-142565, JP-A-50-43140; JP-A-63-80872, JP-A-54-54020, JP-A-5-104061, JP-A-5-127305, JP-B-49-7050, Edgar B. Gutoff et al, "Coating and Drying Defects: Troubleshooting Operating Problems", John Wiley & Sons, 1995, pp. 101-103, etc. In the present invention, one of these methods can be appropriately used with optimization.

In the present invention, the plurality of layers to be formed on the support are each composed of a resin as a main component. The coating solutions for forming the various layers each are preferably a water-dispersed latex. The solid content of the resin in latex form in the various layer coating solutions is preferably from 5% to 80%, particularly preferably from 20% to 60%. The average particle size of the resin to be incorporated in the aforementioned water-dispersed latex is preferably 5 µm or less, particularly preferably 1 µm or less. The aforementioned water-dispersed latex may comprise any known additives such as surface active agent, dispersant and binder resin incorporated therein as necessary.

In the present invention, a plurality of laminates which have been formed on a support by a method described in U.S. Pat. No. 2,761,791 are then preferably rapidly solidified. For example, in the case where a multilayer structure is formed by the solidification of resins, the formation of the plurality of laminates on the support is immediately followed by the rise of temperature. In the case where the coating solution contains a binder which gels at low temperature such as gelatin, it is also preferred that the formation of the plurality of layer coating solutions be immediately followed by the drop of temperature.

In the present invention, the spread of the coating solution per one of the layers constituting the multilayer structure is preferably from 1 g/m² to 50 g/m². The number of layers constituting the multilayer structure is 2 or more and can be arbitrarily predetermined. The receiving layer is preferably provided as a layer farthest from the support.

For forming an image using a heat-sensitive transfer image-receiving sheet, the ink sheet to be used in combination with the aforementioned heat-sensitive transfer image-receiving sheet of the present invention has a dye layer containing a dispersible transfer dye in a support. Any ink sheet may be used. As method for giving a heat energy during heat transfer there may be any known energizing method. For example, by controlling the recording time using a recording device such as thermal printer (e.g., trade name; Video Printer VY-100, produced by Hitachi Limited), a heat energy of from about 5 to 100 mJ/mm² can be given to attain the desired purpose sufficiently.

The heat-sensitive transfer image-receiving sheet of the present invention can comprise a properly selected support so that it can be applied to various uses such as heat-sensitive transfer image-receiving sheets in a sheet or roll form, cards and sheets for transmission type original.

EXAMPLES

The characteristics of the present invention will be further described in the following examples. The materials, added amounts, proportions, treatment conditions, procedural orders, etc. described hereinafter may be properly changed so far as they fall within the essence of the present invention. Accordingly, the scope of the present invention should not be construed as being limited to the following examples.

Example 1

Preparation of Polymer Latex (1-1) Preparation of Latex of Polymer P-1

In a reaction vessel equipped with an agitator and a reflux condenser were charged 500 g of distilled water, 120 g of monomer A-4, 174 g of methyl acrylate, 6 g of acrylic acid, 15 g of Sanded BL (produced by Sanyo Chemical Industries, Ltd.) and 2.25 g of APS (ammonium persulfate). The reaction mixture was then reacted to 70° C. in a nitrogen atmosphere for 6 hours until the reaction was completed to obtain a latex of polymer P-1. The latex thus obtained had a weight-average molecular weight of $3.0 \times 10^5$.

(1-2) Preparation of Latex of Polymer P-6

In a reaction vessel equipped with an agitator and a reflux condenser were charged 500 g of distilled water, 210 g of monomer A-8, 90 g of octyl acrylate, 15 g of Sanded BL and 2.25 g of APS. The reaction mixture was then reacted to 70° C. in a nitrogen atmosphere for 6 hours until the reaction was completed to obtain a latex of polymer P-6. The latex thus obtained had a weight-average molecular weight of $1.9 \times 10^5$.

(1-3) Preparation of Latex of Polymer P-12

In a reaction vessel equipped with an agitator and a reflux condenser were charged 500 g of distilled water, 180 g of A-16, 114 g of tert-butyl acrylate, 6 g of acrylic acid, 15 g of Sanded BL and 2.25 g of APS. The reaction mixture was then reacted to 70° C. in a nitrogen atmosphere for 6 hours until the reaction was completed to obtain a latex of polymer P-12. The latex thus obtained had a weight-average molecular weight of $3.0 \times 10^5$.

(1-4) Preparation of Latex of Polymer P-16

In a reaction vessel equipped with an agitator and a reflux condenser were charged 500 g of distilled water, 60 g of A-26, 240 g of methyl methacrylate, 15 g of Sanded BL and 2.25 g of APS. The reaction mixture was then reacted to 70° C. in a nitrogen atmosphere for 6 hours until the reaction was completed to obtain a latex of polymer P-16. The latex thus obtained had a weight-average molecular weight of $3.0 \times 10^5$.

Preparation of Image-Receiving Sheet (2-1) Preparation of Sample 101 (Comparative Example)

A paper support comprising a polyethylene laminated on both sides thereof was subjected to corona discharge treatment on the surface thereof. A gelatin undercoating layer comprising sodium dodecylbenzenesulfonate was then provided on the corona-discharged surface of the paper support. Subsequently, using a bar coater, a coating composition for interlayer A having the following formulation was spread over the gelatin undercoating layer, and then dried. The spreading of these coating compositions using a bar boater was effected at 40° C. The drying of the various layers was effected at 50° C. for 16 hours. The spreading of the interlayer A coating composition was effected in such an amount that the dried spread reached 1.0 g/m². The spreading of the receiving layer A coating composition was effected in such an amount that the dried spread reached 3.0 g/m².

| <Coating composition for interlayer A> | |
|---|---|
| Polyester resin (Vylon 200, produced by TOYOBO CO., LTD.) | 10 parts by mass |
| Fluorescent brightening agent (Uvitex OB, produced by Ciba Geigy Inc.) | 1 part by mass |
| Titanium oxide | 30 parts by mass |
| Methyl ethyl ketone/toluene (mass ratio: 1/1) | 90 parts by mass |
| <Coating composition for receiving layer A> | |
| Vinyl chloride-vinyl acetate resin (Solbine A (trade name), produced by NISSIN CHEMICAL INDUSTRY CO., LTD.) | 100 parts by mass |
| Amino-modified silicone (X-22-3050C (trade name), produced by Shin-Etsu Chemical Co., Ltd.) | 5 parts by mass |
| Epoxy-modified silicone (X-22-300E (trade name), produced by Shin-Etsu Chemical Co., Ltd.) | 5 parts by mass |
| Methyl ethyl ketone/toluene (mass ratio: 1/1) | 400 parts by mass |

(2-2) Preparation of Sample 102 (Comparative Example)

A paper support comprising a polyethylene laminated on both sides thereof was subjected to corona discharge treatment on the surface thereof. A gelatin undercoating layer comprising sodium dodecylbenzenesulfonate was then provided on the corona-discharged surface of the paper support. A coating composition for interlayer B having the following formulation and a coating composition for receiving layer B having the following formulation were simultaneously spread over the gelatin underlayer in this order from the support side by the method shown in FIG. 9 of U.S. Pat. No. 2,761,791. After spreading, the coat layers were immediately dried at 50° C. for 16 hours. The spreading of the interlayer B coating composition was effected in such an amount that the dried spread reached 15 g/m². The spreading of the interlayer A coating composition was effected in such an amount that the dried spread reached 1.0 g/m². The spreading of the receiving layer A coating composition was effected in such an amount that the dried spread reached 3.0 g/m².

| <Coating composition for interlayer B> | |
|---|---|
| hollow polymer latex (MH5055 (trade name), produced by ZEON CORPORATION) (Dispersing element of hollow-structural polymer having another diameter of 0.5 μm) | 563 parts by mass |
| Gelatin | 120 parts by mass |

| <Coating composition for receiving layer B> | |
|---|---|
| Vinyl chloride-based latex (Vinyblan 609 (trade name), produced NISSIN CHEMICAL INDUSTRY CO., LTD.) | 48 parts by mass |
| Benzotriazole-based ultraviolet absorber polymer latex (ULS1700 (trade name), produced by Ipposha Oil Industries Co., Ltd.) | 15 parts by mass |
| Montan wax (J537 (trade name), produced by CHUKYO YUSHI CO., LTD.) | 10 parts by mass |

(2-3) Preparation of Sample 103 (Inventive)

The simultaneous multi-layer coating was effected in the same manner as in the preparation of Sample 102 except that the coating composition for receiving layer B was replaced by the coating composition for receiving layer C having the following formulation. After spreading, the coat layers were immediately dried at 50° C. for 16 hours. The spreading of the interlayer B coating composition was effected in such an amount that the dried spread reached 15 g/m². The spreading of the receiving layer C coating composition was effected in such an amount that the dried spread reached 3.0 g/m².

| <Coating composition for receiving layer C> | |
|---|---|
| Polymer P-1 | 48 parts by mass |
| Benzotriazole-based ultraviolet absorber polymer latex (ULS1700 (trade name), produced by Ipposha Oil Industries Co., Ltd.) | 15 parts by mass |
| Montan wax (J537 (trade name), produced by CHUKYO YUSHI CO., LTD.) | 10 parts by mass |

(2-4) Preparation of Sample 104 (Inventive)

The simultaneous multi-layer coating was effected in the same manner as in the preparation of Sample 102 except that the coating composition for receiving layer B was replaced by the coating composition for receiving layer D having the following formulation. After spreading, the coat layers were immediately dried at 50° C. for 16 hours. The spreading of the interlayer B coating composition was effected in such an amount that the dried spread reached 15 g/m², The spreading of the receiving layer D coating composition was effected in such an amount that the dried spread reached 3.0 g/m².

| <Coating composition for receiving layer D> | |
|---|---|
| Polymer P-6 | 48 parts by mass |
| Benzotriazole-based ultraviolet absorber polymer latex (ULS1700 (trade name), produced by Ipposha Oil Industries Co., Ltd.) | 15 parts by mass |
| Montan wax (J537 (trade name), produced by CHUKYO YUSKI CO., LTD.) | 10 parts by mass |

(2-5) Preparation of Sample 105 (Inventive)

The simultaneous multi-layer coating was effected in the same manner as in the preparation of Sample 102 except that the coating composition for receiving layer B was replaced by the coating composition for receiving layer E having the following formulation. After spreading, the coat layers were immediately dried at 50° C. for 16 hours. The spreading of the interlayer B coating composition was effected in such an amount that the dried spread reached 15 g/m². The spreading of the receiving layer E coating composition was effected in such an amount that the dried spread reached 3.0 g/m².

| <Coating composition for receiving layer E> | |
|---|---|
| Polymer P-12 | 48 parts by mass |
| Benzotriazole-based ultraviolet absorber polymer latex (ULS1700 (trade name), produced by Ipposha Oil Industries Co., Ltd.) | 15 parts by mass |
| Montan wax (J537 (trade name), produced by CHUKYO YUSHI CO., LTD.) | 10 parts by mass |

(2-6) Preparation of Sample 106 (Inventive)

The simultaneous multi-layer coating was effected in the same manner as in the preparation of Sample 102 except that the coating composition for receiving layer B was replaced by the coating composition for receiving layer F having the following formulation. After spreading, the coat layers were immediately dried at 50° C. for 16 hours. The spreading of the interlayer B coating composition was effected in such an amount that the dried spread reached 15 g/m². The spreading of the receiving layer F coating composition was effected in such an amount that the dried spread reached 3.0 g/m².

| <Coating composition for receiving layer F> | |
|---|---|
| Polymer P-16 | 48 parts by mass |
| Benzotriazole-based ultraviolet absorber polymer latex (ULS1700 (trade name), produced by Ipposha Oil Industries Co., Ltd.) | 15 parts by mass |
| Montan wax (J537 (trade name), produced by CHUKYO YUSHI Co., LTD.) | 10 parts by mass |

Test Examples

Preparation of Ink Sheet

A polyester film having a thickness of 6.0 μm (Lumirror (trade name), produced by Toray Industries, Ltd.) was used as a support. A heat-resistant slip layer (thickness: 1 μm) was formed on the back surface of the film A yellow coating composition, a magenta coating composition and a cyan coating composition having the following formulations were each monochromatically spread over the front surface of the film (dried spread: 1 g/m²) to prepare an ink sheet.

| <Yellow coating composition> | |
|---|---|
| Dye<br>(MACROLEX YELLOW 6G (trade name),<br>produced by Bayer Japan Co., Ltd.) | 5.5 parts by mass |
| Polyvinyl butyral resin<br>(S-LEX BX-1 (trade name), produced by<br>SEKISUI CHEMICAL CO., LTD.) | 4.5 parts by mass |
| Methyl ethyl ketone/toluene (weight ratio: 1/1) | 90 parts by mass |
| <Magenta coating composition> | |
| Magenta dye (Disperse Red 60) | 5.5 parts by mass |
| Polyvinyl butyral resin<br>(S-LEX BX-1 (trade name), produced by<br>SEKISUI CHEMICAL CO., LTD.) | 4.5 parts by mass |
| Methyl ethyl ketone/toluene (weight ratio: 1/1) | 90 parts by mass |
| <Cyan coating composition> | |
| Cyan dye (Solvent Blue 63) | 5.5 parts by mass |
| Polyvinyl butyral resin<br>(S-LEX BX-1 (trade name), produced by<br>SEKISUI CHEMICAL CO., LTD.) | 4.5 parts by mass |
| Methyl ethyl ketone/toluene (weight ratio: 1/1) | 90 parts by mass |

Image Formation

The ink sheet thus prepared and the image-receiving sheets of Samples 101 to 106 were each then worked so as to be loaded in a Type DPB 1500 (trade name) sublimation type printer (produced by NIPPON DENSAN COPAL CO., LTD.). With these samples loaded in the printer, a solid black image was then outputted in a high speed print mode under the conditions such that a highest density was obtained.

Evaluation (1) Measurement of Relative Transfer Density

The black image obtained under the aforementioned conditions was then measured for visual density using a photographic densitometer (produced by X-Rite Incorporated). The measurement were each represented relative to that of Sample 101 as 100.

(2) Evaluation of Image Defects

The number of white mark defects which can be visually detected on the black image obtained under the aforementioned conditions was then counted. The number of white mark defects having a diameter of 0.5 mm or more was counted. The image defects were then evaluated on the basis of the number of white mark defects per a sheet of image having a size of 12 cm×10 cm according to the following criterion.

E: One or less white marks per size of 12 cm×10 cm

G: From not smaller than 2 to less than 10 per size of 12 cm×10 cm

F: From not smaller than 10 to less than 100 per size of 12 cm×10 cm

P: 100 or more per size of 12 cm×10 cm (3) Evaluation of Change of Image Sharpness The image-receiving sheet was stored at a temperature of 25° C. and a relative humidity of 50% for 10 days. An image was then outputted on the image-receiving sheet in the same manner as mentioned above. The image A thus obtained was then measured for sharpness. The image-receiving sheet was also stored at a temperature of 25° C. and a relative humidity of 80% for 10 days. An image was then outputted on the image-receiving sheet in the same manner as mentioned above. The image B thus obtained was then measured for sharpness. The sharpness of the image A and the image B was then compared. The change of sharpness from before storage was then evaluated according to the following criterion.

1: Little or no change of sharpness

2: Slight change of sharpness but practically acceptable

3: Change of sharpness observed, color bleeding occurs

The aforementioned measurements and results of evaluation are set forth in Table 1 below.

TABLE 1

| | Relative transfer density | Image defects | Sharpness change |
|---|---|---|---|
| Sample 101 (comparative) | 100 | F | 1 |
| Sample 102 (comparative) | 110 | G | 3 |
| Sample 103 (inventive) | 132 | E | 1 |
| Sample 104 (inventive) | 122 | G | 1 |
| Sample 105 (inventive) | 122 | E | 1 |
| Sample 106 (inventive) | 130 | G | 1 |

As can be seen in the results of Table 1, Sample 101, which had been obtained by the spreading of an organic solvent-based coating composition, showed a low relative transfer density and was observed to have surface defects. Sample 102, which had been obtained by the spreading of a coating composition containing a vinyl chloride-based latex, showed some rise of relative transfer density from that of Sample 101 but had an image sharpness drop.

On the other hand, all Inventive Samples 103 to 106 showed a high relative transfer density and a high sensitivity. These inventive samples also showed little surface defects and an excellent image sharpness. It was thus confirmed that the use of a polymer latex containing a repeating unit derived from a monomer represented by the formula [1] makes it possible to obtain a heat-sensitive transfer image-receiving sheet having a high sensitivity and no surface defects.

Example 2

Six samples were prepared in the same manner as in Example 1 except that the ultraviolet absorber polymer latex was changed from ULS1700 to ULS1635MH (trade name: Ipposha Oil Industries Co., Ltd.). The amount of ULS1635 to be used was predetermined such that the solid content of the polymer latex reached the same mass. The six samples were each then evaluated in the same manner as in Example 1. As a result, it was confirmed that the use of a polymer latex containing a repeating unit derived from a monomer represented by the formula [1] makes it possible to obtain a heat-sensitive transfer image-receiving sheet having a high sensitivity and no surface defects.

The heat-sensitive transfer image-receiving sheet of the invention has a high sensitivity, little image defects and a high sharpness. Further, the use of the coating composition of the invention makes it possible to produce a heat-sensitive transfer image-receiving sheet having these characteristics by a simple method. Accordingly, the invention has a high industrial applicability.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 054021/2006 filed on Feb. 28, 2006, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A coating composition for producing a heat-sensitive transfer image-receiving sheet comprising at least one receiving layer on a support, wherein the coating composition contains a polymer latex containing a repeating unit derived from a monomer represented by the following formula [1];

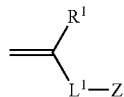

Formula [1]

wherein $R^1$ represents a hydrogen atom, halogen atom or methyl group; $L^1$ represents a divalent connecting group; and Z represents a $C_8$-$C_{50}$ straight-chain, branched or cyclic hydrocarbon group.

2. The coating composition for producing a heat-sensitive transfer image-receiving sheet according to claim 1, wherein the monomer represented by the formula [1] is a monomer represented by the following formula [2]:

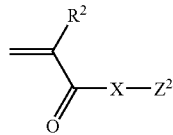

Formula [2]

wherein $R^2$ represents a hydrogen atom, halogen atom or methyl group; X represents an oxygen atom, sulfur atom or .N($R^c$)— in which $R^c$ represents a hydrogen atom or a $C_1$-$C_8$ alkyl group which may have substituents; and $Z^2$ represents a $C_{12}$-$C_{40}$ straight-chain or branched hydrocarbon group.

3. The coating composition for producing a heat-sensitive transfer image-receiving sheet according to claim 1, wherein the monomer represented by the formula [1] is a monomer represented by the following formula [3]:

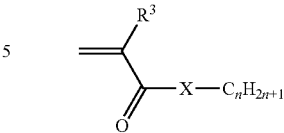

Formula [3]

wherein $R^3$ represents a hydrogen atom, halogen atom or methyl group; X represents an oxygen atom, sulfur atom or —N($R^c$)— in which $R^c$ represents a hydrogen atom or a $C_1$-$C_8$ alkyl group which may have substituents; and n represents an integer of from 20 to 30.

4. The coating composition for producing a heat-sensitive transfer image-receiving sheet according to claim 1, wherein the polymer latex contains a copolymer containing a repeating unit represented by the formula [1] and a repeating unit represented by the following formula [4]:

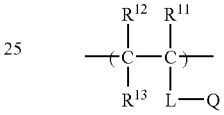

Formula [4]

wherein $R^{11}$, $R^{12}$ and $R^{13}$ each independently represent a hydrogen atom or substituent; L represents a group selected from the following group of connecting groups or a divalent connecting group formed by two or more thereof in combination; and Q represents —COOH or a salt thereof, —SO$_3$H or a salt thereof or —OPO$_3$H or a salt thereof, (Group of connecting groups)

Single bond, —O—, —CO—, —NR$^{14}$—, —S—, —SO$_2$—, —P(=O)(OR$^{15}$)—, alkylene group, arylene group, in which $R^{14}$ represents a hydrogen atom, alkyl group, aryl group or aralkyl group and $R^{15}$ represents an alkyl group, aryl group or aralkyl group.

5. The coating composition for producing a heat-sensitive transfer image-receiving sheet according to claim 1, wherein the coating composition is a coating composition for receiving layer.

6. A heat-sensitive transfer image-receiving sheet comprising at least one receiving layer on a support, wherein the receiving layer contains a" polymer latex containing a repeating unit derived from a monomer represented by the following formula [1]:

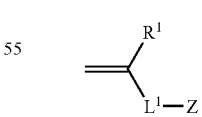

Formula [1]

wherein $R^1$ represents a hydrogen atom, halogen atom or methyl group; $L^1$ represents a divalent connecting group; and Z represents a $C_8$-$C_{50}$ straight-chain, branched or cyclic hydrocarbon group.

7. The heat-sensitive transfer image-receiving sheet according to claim 6, wherein a heat insulating layer containing a hollow particulate material is provided between the support and the receiving layer.

8. The heat-sensitive transfer image-receiving sheet according to claim 7, wherein the heat insulating layer further contains gelatin.

9. The heat-sensitive transfer image-receiving sheet according to claim 6, wherein the monomer represented by the formula [1] is a monomer represented by the following formula [2]:

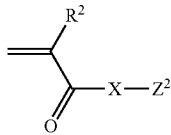

Formula [2]

wherein $R^2$ represents a hydrogen atom, halogen atom or methyl group; X represents an oxygen atom, sulfur atom or —N($R^c$)— in which $R^c$ represents a hydrogen atom or a $C_1$-$C_8$ alkyl group which may have substituents; and $Z^2$ represents a $C_{12}$-$C_{40}$ straight-chain or branched hydrocarbon group.

10. The heat-sensitive transfer image-receiving sheet according to claim 6, wherein the monomer represented by the formula (1) is a monomer represented by the following formula [3]:

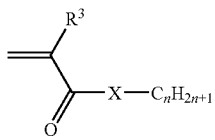

Formula [3]

wherein $R^3$ represents a hydrogen atom, halogen atom or methyl group; X represents an oxygen atom, sulfur atom or —N($R^c$)— in which $R^c$ represents a hydrogen atom or a $C_1$-$C_8$ alkyl group which may have substituents; and n represents an integer of from 20 to 30.

11. The heat-sensitive transfer image-receiving sheet according to claim 6, wherein the polymer latex contains a copolymer containing a repeating unit represented by the formula [1] and a repeating unit represented by the following formula [4]:

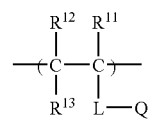

Formula [4]

wherein $R^{11}$, $R^{12}$ and $R^{13}$ each independently represent a hydrogen atom or substituent; L represents a group selected from the following group of connecting groups or a divalent connecting group formed by two or more thereof in combination; and Q represents —COOH or a salt thereof, —$SO_3H$ or a salt thereof or —$OPO_3H$ or a salt thereof, (Group of connecting groups)

Single bond, —O—, —CO—, —$NR^{14}$—, —S—, —$SO_2$—, —P(=O)($OR^{15}$)—, alkylene group, arylene group, in which $R^{14}$ represents a hydrogen atom, alkyl group, aryl group or aralkyl group and $R^{15}$ represents an alkyl group, aryl group or aralkyl group.

12. The heat-sensitive transfer image-receiving sheet according to claim 6, wherein the support is a paper sheet comprising a polyethylene laminated on the both sides thereof.

13. The heat-sensitive transfer image-receiving sheet according to claim 6, wherein the receiving layer further contains an ultraviolet absorbing polymer latex.

* * * * *